United States Patent
Mialon et al.

(10) Patent No.: US 9,624,340 B2
(45) Date of Patent: *Apr. 18, 2017

(54) POLY(DIHYDROFERULIC ACID) A BIORENEWABLE POLYETHYLENE TEREPHTHALATE MIMIC DERIVED FROM LIGNIN AND ACETIC ACID AND COPOLYMERS THEREOF

(71) Applicant: UNIVERSITY OF FLORIDA RESEARCH FOUNDATION, INC., Gainesville, FL (US)

(72) Inventors: Laurent Mialon, Newcastle Upon Tyne (GB); Stephen A. Miller, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,360

(22) Filed: Jun. 9, 2015

(65) Prior Publication Data

US 2015/0274883 A1 Oct. 1, 2015

Related U.S. Application Data

(60) Division of application No. 13/674,561, filed on Nov. 12, 2012, now Pat. No. 9,080,011, which is a continuation-in-part of application No. PCT/US2011/036181, filed on May 12, 2011.

(60) Provisional application No. 61/334,342, filed on May 13, 2010.

(51) Int. Cl.
| | |
|---|---|
| *C08G 63/66* | (2006.01) |
| *C08G 63/06* | (2006.01) |
| *C08G 63/00* | (2006.01) |
| *C08G 63/83* | (2006.01) |

(52) U.S. Cl.
CPC .......... *C08G 63/00* (2013.01); *C08G 63/065* (2013.01); *C08G 63/66* (2013.01); *C08G 63/83* (2013.01)

(58) Field of Classification Search
CPC ...... C08G 63/00; C08G 63/065; C08G 63/66; C08G 63/83
See application file for complete search history.

(56) References Cited

U.S. PATENT DOCUMENTS

| | | |
|---|---|---|
| 4,230,817 A | 10/1980 | Charbonneau |
| 2009/0246430 A1 | 10/2009 | Kriegel et al. |
| 2010/0204378 A1 | 8/2010 | O'Connor |

FOREIGN PATENT DOCUMENTS

| | | |
|---|---|---|
| JP | 2009-536236 | 10/2009 |
| WO | WO 93/23451 | 11/1993 |
| WO | WO 2011/143379 | 11/2011 |

OTHER PUBLICATIONS

Mohanty, A.K. et al., "Sustainable Bio-Composites from Renewable Resources: Opportunities and Challenges in the Green Materials World," *Journal of Polymers and the Environment*, Apr. 2002, pp. 19-26, vol. 10, Nos. 1/2.

Rosazza, J.P.N. et al., "Review: Biocatalytic transformations of ferulic acid: an abundant aromatic natural product," *Journal of Industrial Microbiology*, 1995, pp. 457-471, vol. 15.

Mialon, L. et al., "Biorenewable polyethylene terephthalate mimics derived from lignin and acetic acid," *Green Chem.*, 2010, pp. 1704-1706, vol. 12.

Chung, T-S, "The Recent Development of Thermotropic Liquid Crystalline Polymers," *Polymer Engineering and Science*, Jul. 1986, pp. 901-919, vol. 26, No. 13.

*Primary Examiner* — Ling Choi
*Assistant Examiner* — Gennadiy Mesh
(74) *Attorney, Agent, or Firm* — Saliwanchik, Lloyd & Eisenschenk

(57) ABSTRACT

A biorenewable thermoplastic, poly(dihydroferulic acid) (PHFA), which is an effective polyethylene terephthalate (PET) mimic is disclosed. The PHFA can be prepared by the self-condensation of acetyldihydroferulic acid as the monomer that can be synthesized from the starting material-ferulic acid, which can be isolated from lignin, rice bran, or other biorenewable sources.

9 Claims, 20 Drawing Sheets

POLY(DIHYDROFERULIC ACID) A BIORENEWABLE POLYETHYLENE TEREPHTHALATE MIMIC DERIVED FROM LIGNIN AND ACETIC ACID AND COPOLYMERS THEREOF

CROSS-REFERENCE TO RELATED APPLICATIONS

This application is a divisional of U.S. application Ser. No. 13/674,561, filed Nov. 12, 2012, which is a continuation-in-part of International Patent Application No. PCT/US2011/036181, filed May 12, 2011, which claims the benefit of U.S. Provisional Application Ser. No. 61/334,342, filed May 13, 2010, the disclosures of which are hereby incorporated by reference herein in their entireties, including any figures, tables, or drawings.

The subject invention was made with government support under the National Science Foundation, Contract No. 0848236. The government has certain rights to this invention.

BACKGROUND OF INVENTION

The development of new polymeric materials from renewable resources is gaining considerable attention. Biorenewability is directed toward a sustainable raw material supply where the raw material is renewed from plants or other biological matter, generally through agricultural. Biorenewable polymers are pursued as environmentally friendly replacements for commodity plastics from petrochemical starting materials. The goal is to use low cost readily available starting materials from biorenewable resources such that biorenewable polymers can be competitive with current commercial plastics in the marketplace.

Rather than creating a biorenewable polymer directly from a crop with the limitations imposed by nature with respect to processing and properties, a practical goal is to develop polymers from monomers derived from biorenewable sources that are chemically identical to or a mimic of those derived from petroleum sources. In this manner the market for the biorenewable polymer need not be generated, as materials with the properties to be provided by the new polymers are presently commodities. Additionally, polymerization techniques and processing technologies that are developed along with the monomers for the biorenewable polymers can be designed in light of the methods currently used to produce the commodity polymers.

In general, thermoplastics constitute more than 65% of all global polymer demand and have the possibility to be recycled by melt-processing. Thermoplastic biorenewable polymers are potentially recyclable, which is advantageous for consumer packaging and other high volume needs. A commercially important thermoplastic or its mimic that is prepared by a step-growth process is a particularly practical target for biorenewable monomers.

Step-growth produced polyethylene terephthalate (PET) is the third most common synthetic polymer and accounts for about 20% of world polymer production. This aromatic/aliphatic polyester has very useful thermal properties that are not displayed in an all-aliphatic commodity thermoplastic. PET displays a glass transition temperature ($T_g$) of 67° C. and a melting temperature ($T_m$) of 265° C. The key aromatic monomer for preparation of PET, terephthalic acid, is derived from petroleum, and its complementary monomer, ethylene glycol, is derived from petroleum or natural gas.

The design of a sustainable PET mimic requires an aromatic monomer. To this end, an attractive biorenewable source for the aromatic monomer is lignin. Lignin is found in all vascular plants and is the second most abundant naturally-occurring organic polymer, making up approximately 30% of wood. The extraction of lignin from wood is carried out in large scale in the paper pulping industry, and as such, constitutes an attractive source for a PET mimic. In addition to lignin, the bran of rice and maize offers attractive opportunities to harvest potentially useful aromatic/aliphatic monomers. One such monomer, ferulic acid (4-hydroxy-3-methoxycinnamic acid), is found in the cell walls of several plants and is one of the most abundant hydroxycinnamic acids in the plant world. Ferulic acid enhances the rigidity and strength of plants from several families including various grasses such as Graminaceae, vegetable plants from the Solanace family, as well as many flowering plants from the groups of both Monocots as well as Dicots. Seeds of coffee, apple, artichoke, peanut, and orange, as well as both seeds and cell walls of rice, wheat, and oats all contain this phenolic phytochemical. Perhaps the greatest naturally occurring source comes from maize bran, a plant with highly cross-linked cell walls containing esterified ferulic acid, making the structure rather impervious to enzymatic degradation. To this end the preparation of material with comparable thermal properties to polyethylene terephthalate (PET) and polystyrene (PS), two of the most widely used synthetic petroleum derived polymers, based on a functionalized ferulic acid, is a desirable way to achieve the goal of a biorenewable polymer.

BRIEF SUMMARY

An embodiment of the invention is directed to a biorenewable thermoplastic homopolymer comprising poly(dihydroferulic acid), which is a PET mimic. The poly(dihydroferulic acid) can have at least one acetoxy end group. In other embodiments of the invention an aromatic/aliphatic polymer of the structure:

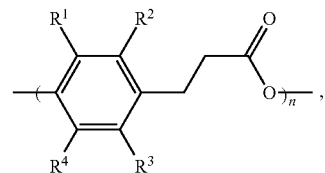

wherein $R^1$, $R^2$, $R^3$, $R^4$ are independently H or OR where R is $C_1$ to $C_6$ alkyl can be produced and can have an acetoxy end-group. Some of these polymers can be prepared from monomers that can be derived from biorenewable resources.

An embodiment of the invention is directed to a method of preparing poly(dihydroferulic acid) where acetyldihydroferulic acid and a catalyst are combined and the acetyldihydroferulic acid polymerized to poly(dihydroferulic acid) with the liberation of acetic acid. The acetyldihydroferulic acid can be derived from a biorenewable source, for example lignin. In another embodiment of the invention, the polymerization of a monomer of the structure:

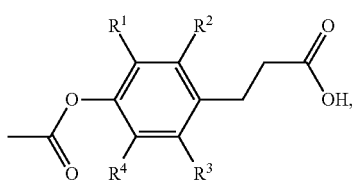

where $R^1$, $R^2$, $R^3$, $R^4$ are independently H or OR where R is $C_1$ to $C_6$ alkyl can be combined with a catalyst and polymerized to any polymer of the structure:

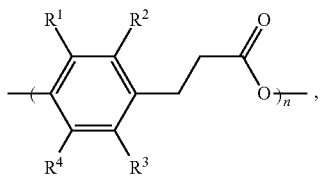

wherein $R^1$, $R^2$, $R^3$, $R^4$ are independently H or OR where R is $C_1$ to $C_6$ alkyl with the liberation of acetic acid. For these polymerizations, the catalyst comprises an oxide, alkoxide or acetate of Sb, Ti, Ge, Hg, Si, Zr, Al, or Zn, such as $Zn(OAc)_2$. The polymerization can be carried out under vacuum and can be carried out at a temperature of 200 to 300° C.

An embodiment of the invention is directed to a copolymer of acetylferulic acid and acetyldihydroferulic acid for the preparation of a thermoplastic. Another embodiment of the invention is directed to a method for the copolymerizing acetylferulic acid and acetyldihydroferulic acid with a variety of comonomer ratios.

DETAILED DISCLOSURE

Figure 1:
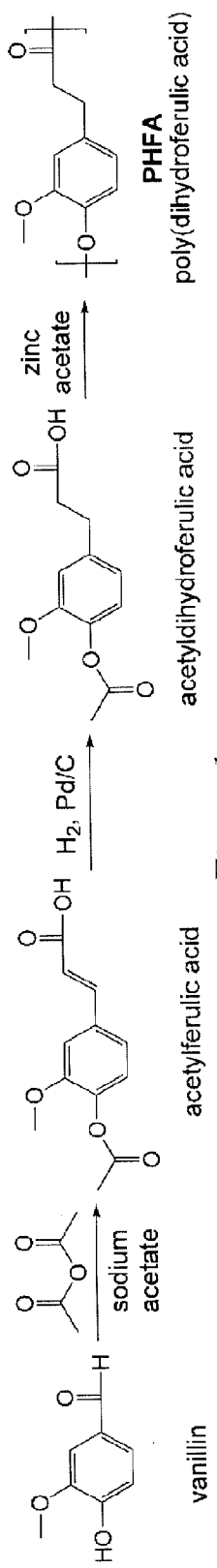
FIG. 1 shows a synthetic scheme for the preparation of poly(dihydroferulic acid), PHFA, from biorenewable feedstocks in accordance with an embodiment of the invention.

Embodiments of the invention are directed to a novel biorenewable polymer, poly(dihydroferulic acid) (PHFA), and a method for its preparation by the step-growth polycondensation of a biorenewable monomer, acetyldihydroferulic acid. The preparation of the biorenewable polymer begins with the aromatic aldehyde, vanillin, which can be extracted from lignin at up to about 5% by mass of the lignin. As shown in FIG. 1, vanillin is condensed with acetic anhydride in the presence of a base, a Perkin reaction, to yield acetylferulic acid. Acetic anhydride can be prepared commercially from biorenewable sources. Acetylferulic acid is subsequently reduced with $H_2$ to acetyldihydroferulic acid. Polytransesterification of the acetyldihydroferulic acid results in the desired PHFA with the liberation of acetic acid, which can be recycled for the preparation of acetic anhydride if desired. As the PHFA results from the self condensation of acetyldihydroferulic acid, no molecular weight limitations due to a stoichiometric imbalance of reactive functionality is possible. The net transformation from vanillin to PHFA has the potential for the very efficient use of the renewable resources. In another embodiment dihydroferulic acid can be polymerized to PHFA.

The PHFA is biorenewable and is potentially recyclable. PHFA is a polyethylene terephthalate (PET) mimic, displaying a $T_m$ of 234° C. and a $T_g$ of 73° C. Hence, the thermal processing and recycling of PHFA and PET, $T_m$=265° C. and $T_g$=67° C., is inherently similar, and for many applications the thermal properties of PHFA are arguably an improvement over those of PET. Devices, such as plastic water bottles, which are commonly made of PET, have uses confined by the thermal properties of the amorphous phase reflected in the $T_g$, and can be formed from PHFA with no compromise. Since most PET devices are rarely subjected to extremely high temperatures during routine use, the lower $T_m$ of PHFA implies that it can be readily substituted and allow a facile processability with lower energy consumption. PHFA also has a cooling-cycle crystallization temperature that is 17° C. higher (207° C.) than that of PET (190° C.), suggesting a faster rate of crystallization which is conducive to greater throughput of PHFA devices during extrusion, spinning, or molding processes than is possible for PET that has a lamentably slow crystallization rate.

Additionally, PHFA typically exhibits a peak decomposition temperature near 462° C. (50% mass loss under nitrogen, as measured by thermal gravimetric analysis), which is comparable to that of PET (470° C.).

In one embodiment of the invention, the polymerization method for formation of PHFA involves melting acetyldihydroferulic acid in the presence of a catalyst. The catalyst can be any that can be used for the polymerization to PET such as $Sb_2O_3$. Additionally other oxides, alkoxides or acetates of Sb, Ti, Ge, Hg, Si, Zr, Al, or Zn can be used, for example $Zn(OAc)_2 \cdot 2H_2O$. Polycondensation can be carried out at temperatures as low as about 200 to 220° C. but can be carried out at higher temperatures in excess of 220° C. but below about 370° C., for example 280 to 300° C. The polymerization can be carried out under a dynamic vacuum to effectively remove acetic acid and drive the polymerization. Traditional "solid stating" and either standard or flow induced "crystallizing" steps that are used for the preparation of PET can be included for the processing of PHFA.

The method employed to provide the biorenewable acetyldihydroferulic acid can provide other aromatic/aliphatic polyesters from a phenyl substituted 3-(4-acetoxyphenyl)propanoic acid. For example, syringaldehyde, which can also be isolated from lignin, can be converted into 3-(4-acetoxy-3,5-dimethoxyphenyl)acrylic acid, reduced to 3-(4-acetoxy-3,5-dimethoxyphenyl)propanoic acid and self-condensed to a poly(3-(4-hydroxy-3,5-dimethoxyphenyl)propanoic acid) in an analogous manner to that for the preparation of PHFA. Hence, any monomer of the structure:

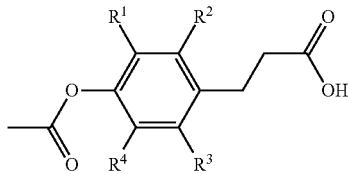

where $R^1$, $R^2$, $R^3$, $R^4$ are independently H or OR where R is $C_1$ to $C_6$ alkyl can be employed to prepare an aromatic/aliphatic polyester of the structure:

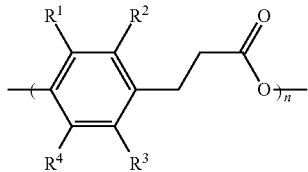

where $R^1$, $R^2$, $R^3$, $R^4$ are independently H or OR where R is $C_1$ to $C_6$ alkyl, according to an embodiment of the invention. The aromatic/aliphatic polyester can have acetoxy terminal units.

Figure 10:
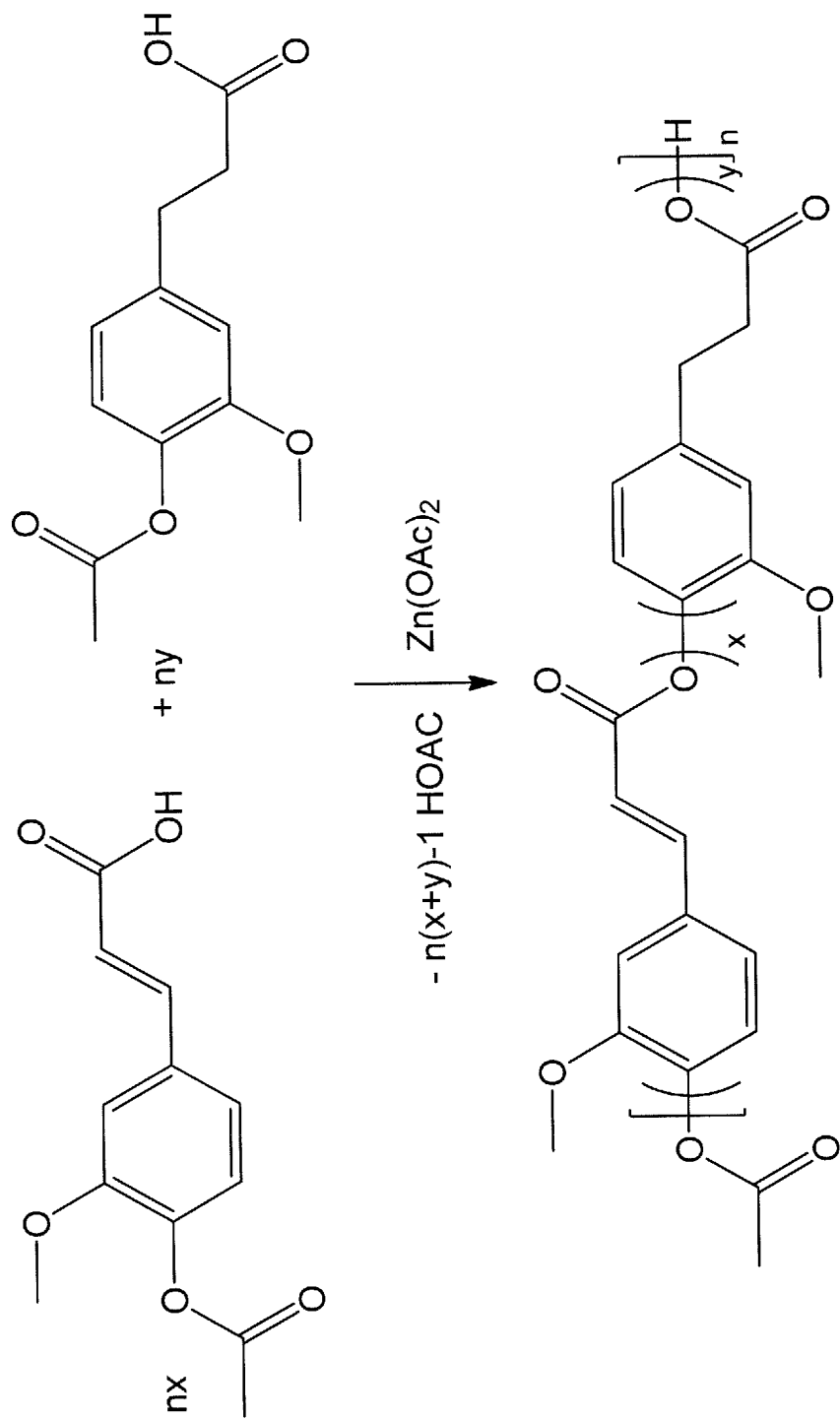
FIG. 10 shows a synthetic scheme for the preparation of poly(dihydroferulic acid-co-ferulic acid) in accordance with an embodiment of the invention.
Figure 11:
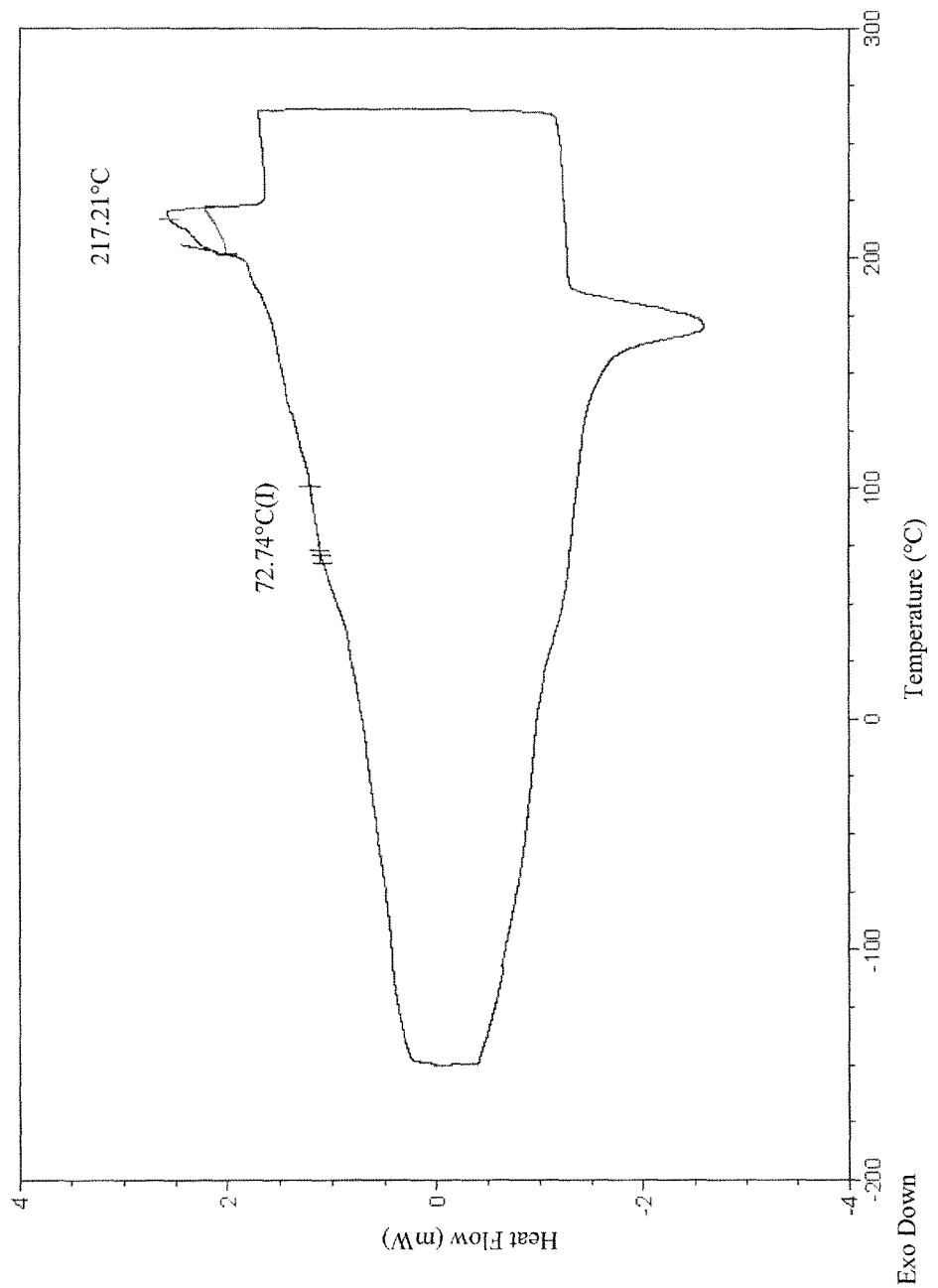
FIG. 11 is a DSC thermogram of 10:90 poly(ferulic acid-co-dihydroferulic acid), in accordance with an embodiment of the invention.
Figure 12:
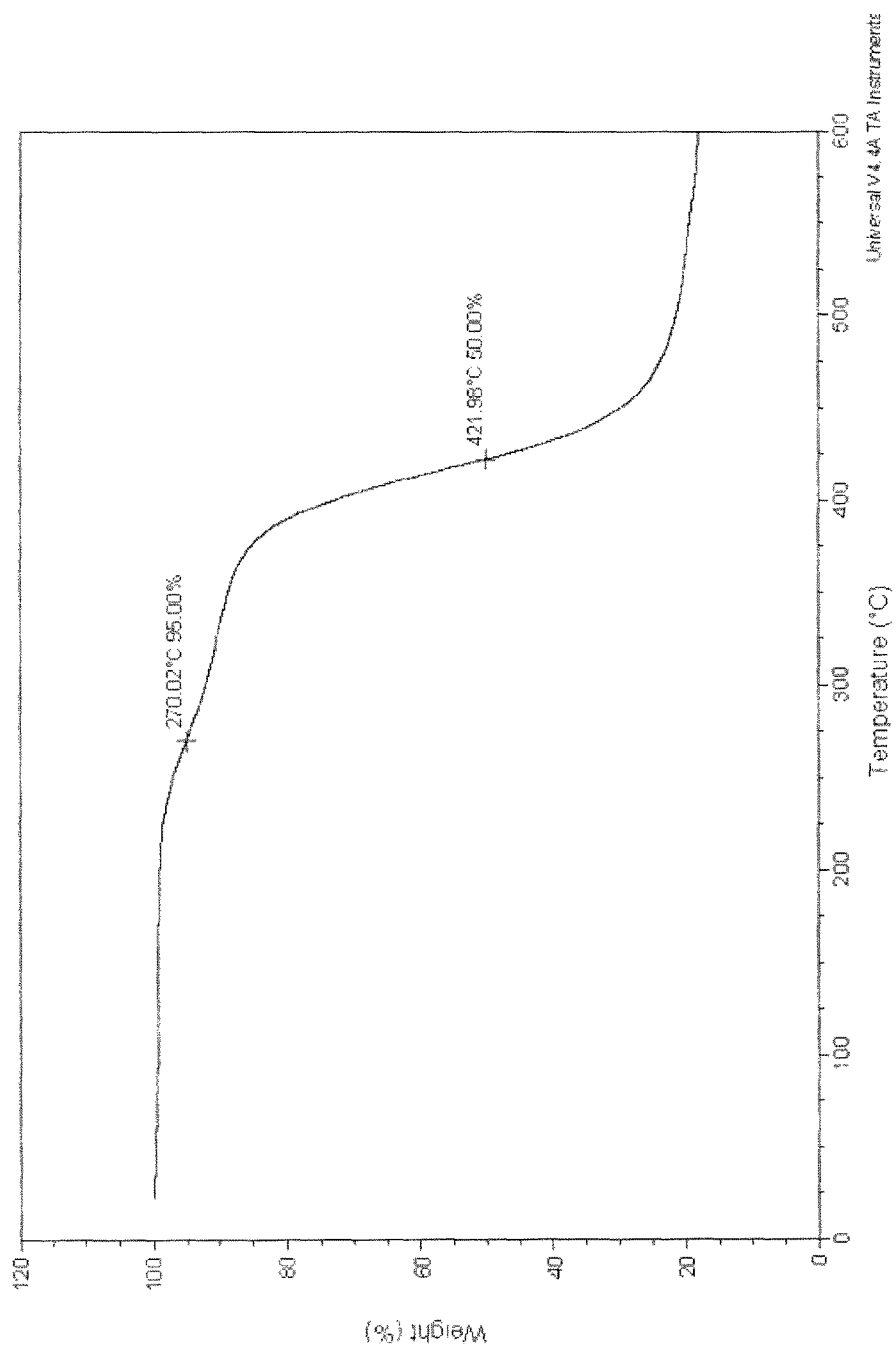
FIG. 12 is a TGA plot for 10:90 poly(ferulic acid-co-dihydroferulic acid), in accordance with an embodiment of the invention.
Figure 13:
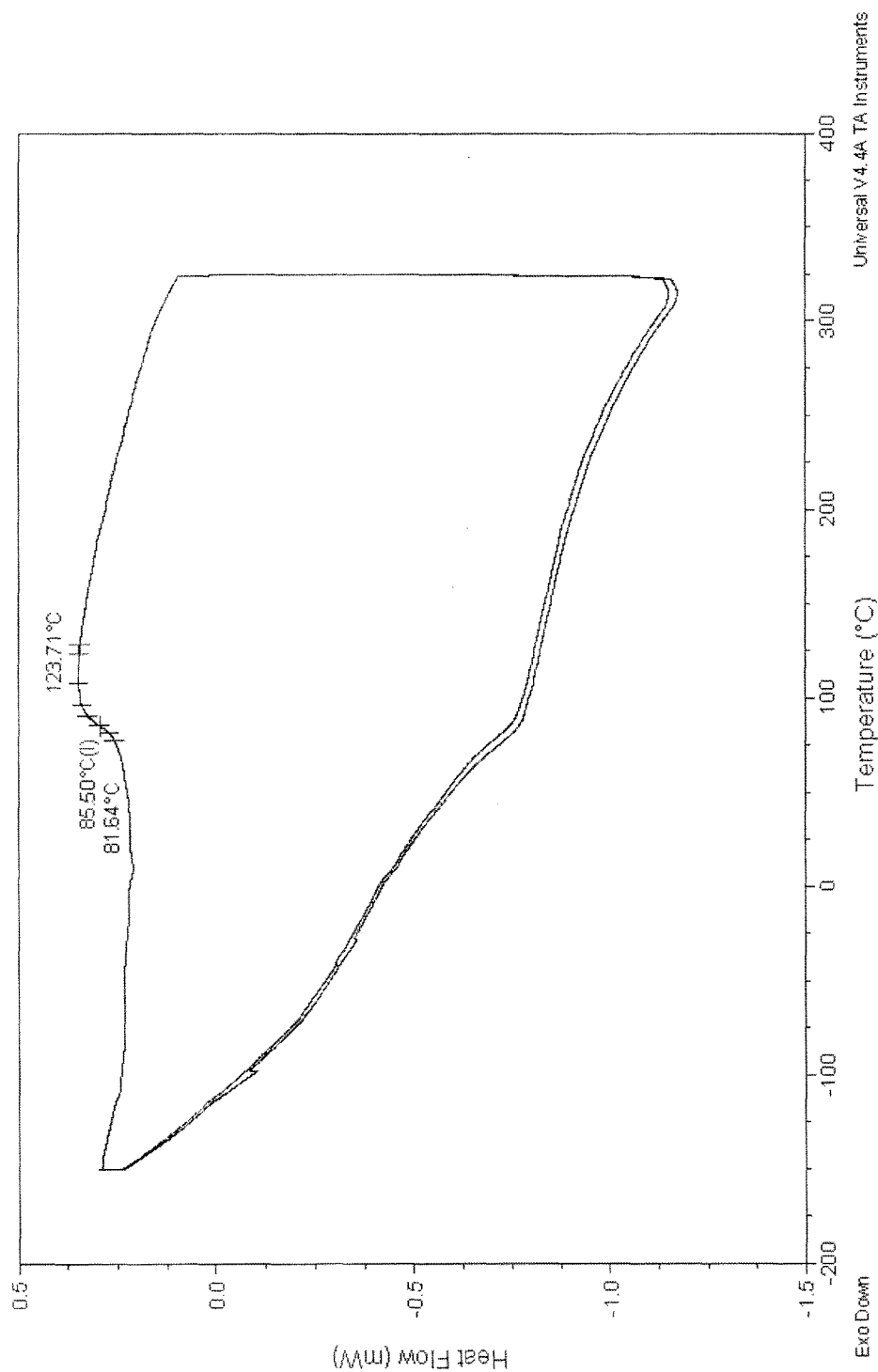
FIG. 13 is a DSC thermogram of 30:70 poly(ferulic acid-co-dihydroferulic acid), in accordance with an embodiment of the invention.
Figure 14:
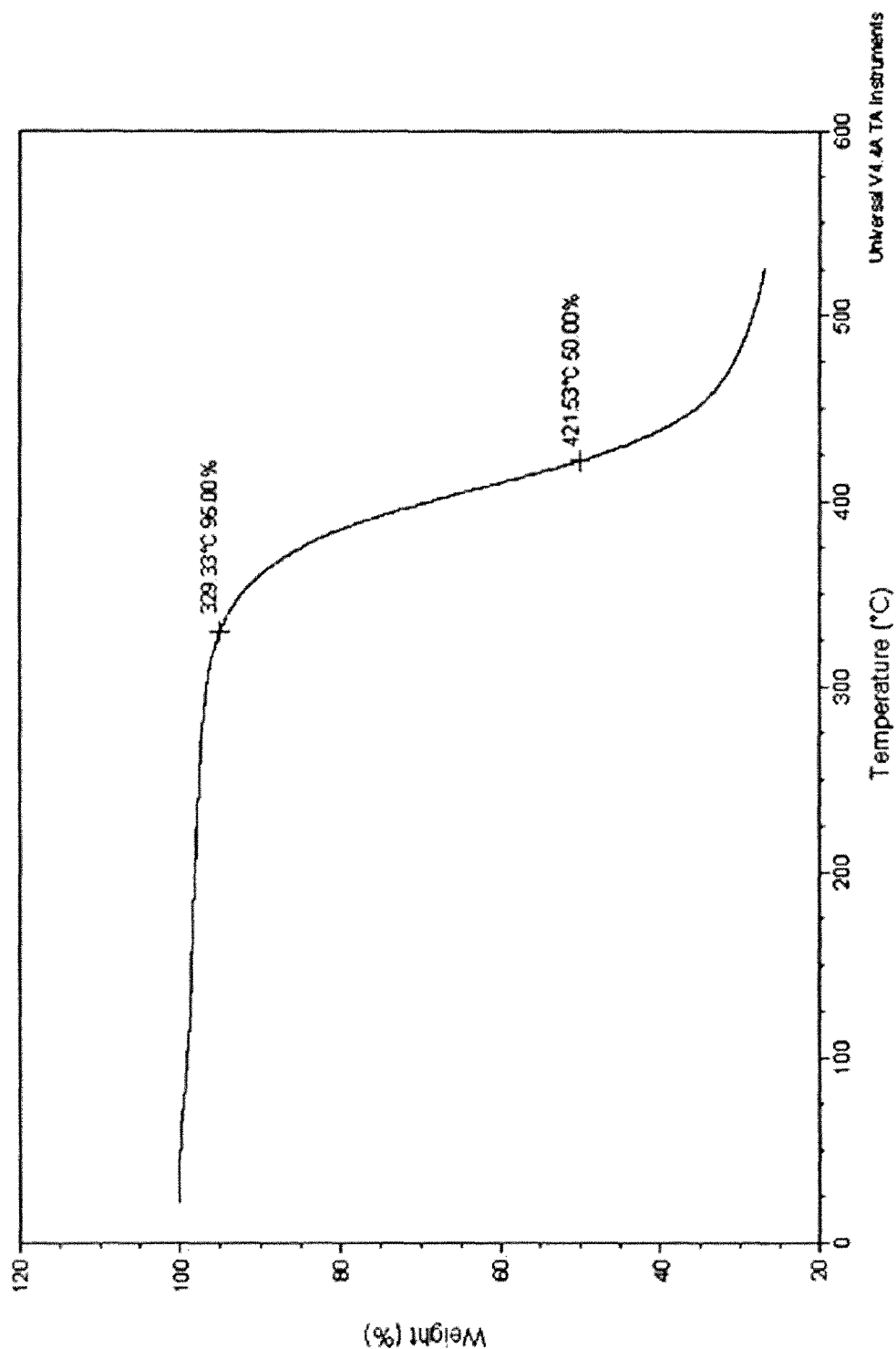
FIG. 14 is a TGA plot for 30:70 poly(ferulic acid-co-dihydroferulic acid), in accordance with an embodiment of the invention.
Figure 15:
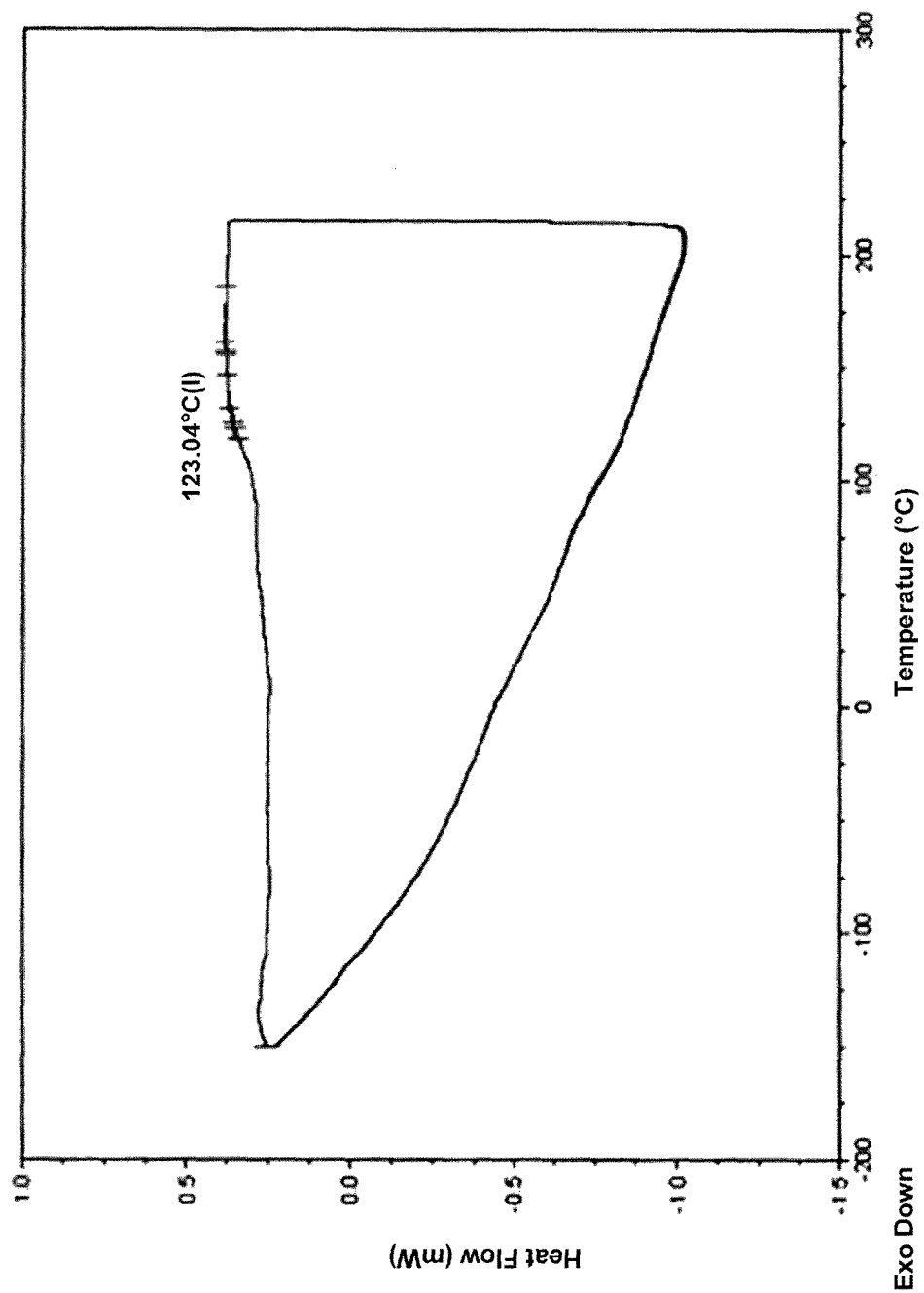
FIG. 15 is a DSC thermogram of 70:30 poly(ferulic acid-co-dihydroferulic acid), in accordance with an embodiment of the invention.
Figure 16:
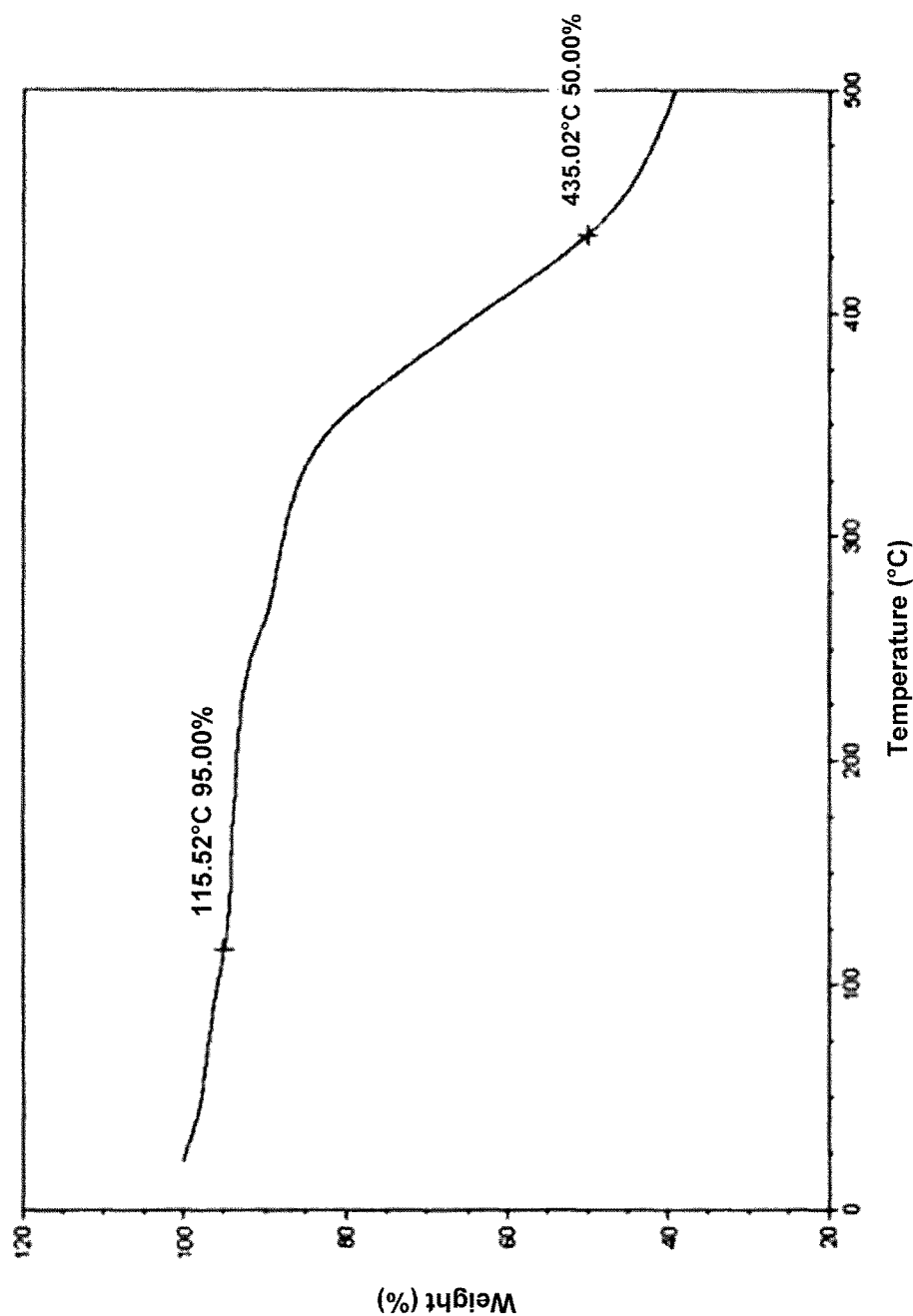
FIG. 16 is a TGA plot for 70:30 poly(ferulic acid-co-dihydroferulic acid), in accordance with an embodiment of the invention.
Figure 17:
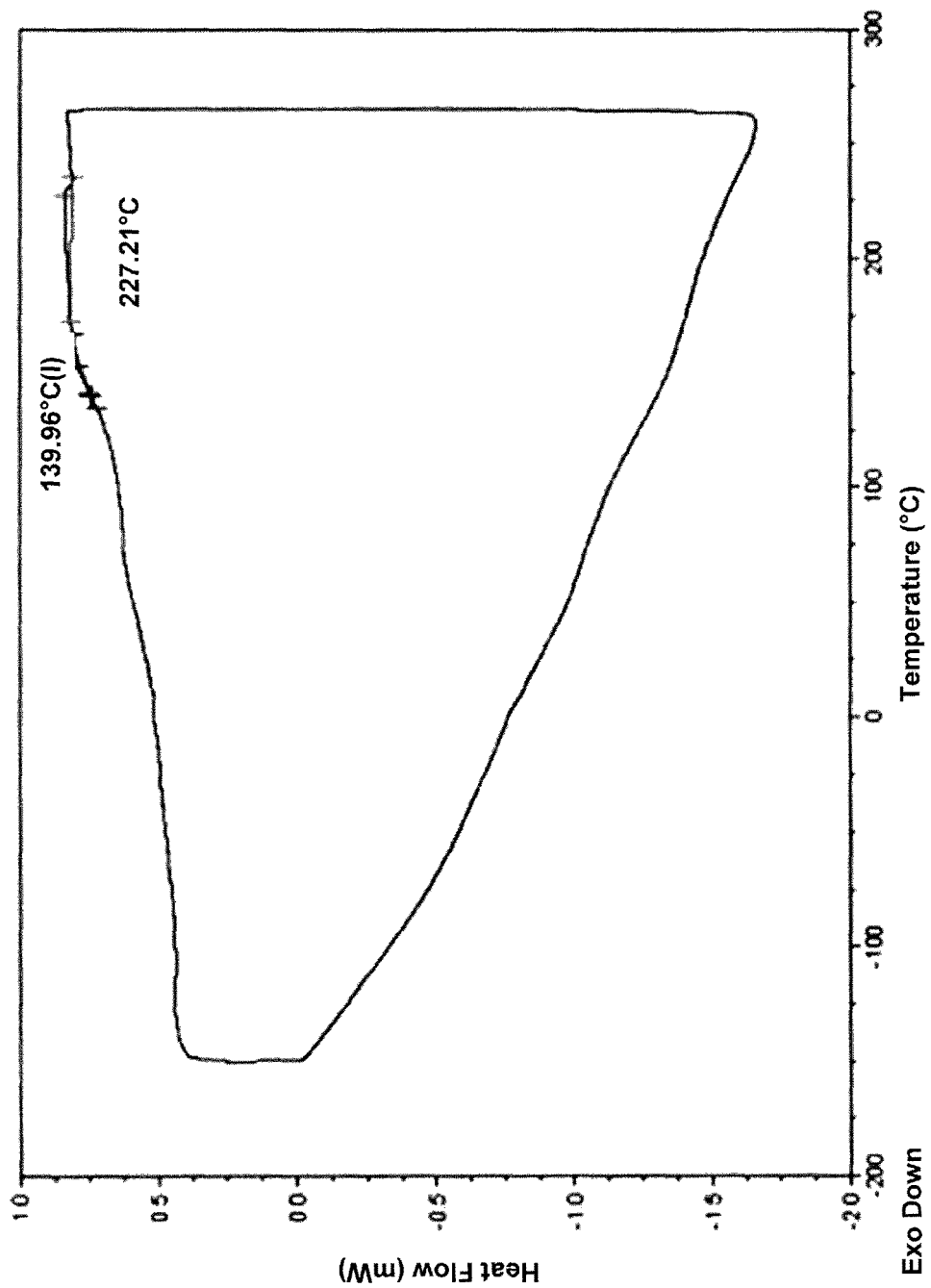
FIG. 17 is a DSC thermogram of 90:10 poly(ferulic acid-co-dihydroferulic acid), in accordance with an embodiment of the invention.
Figure 18:
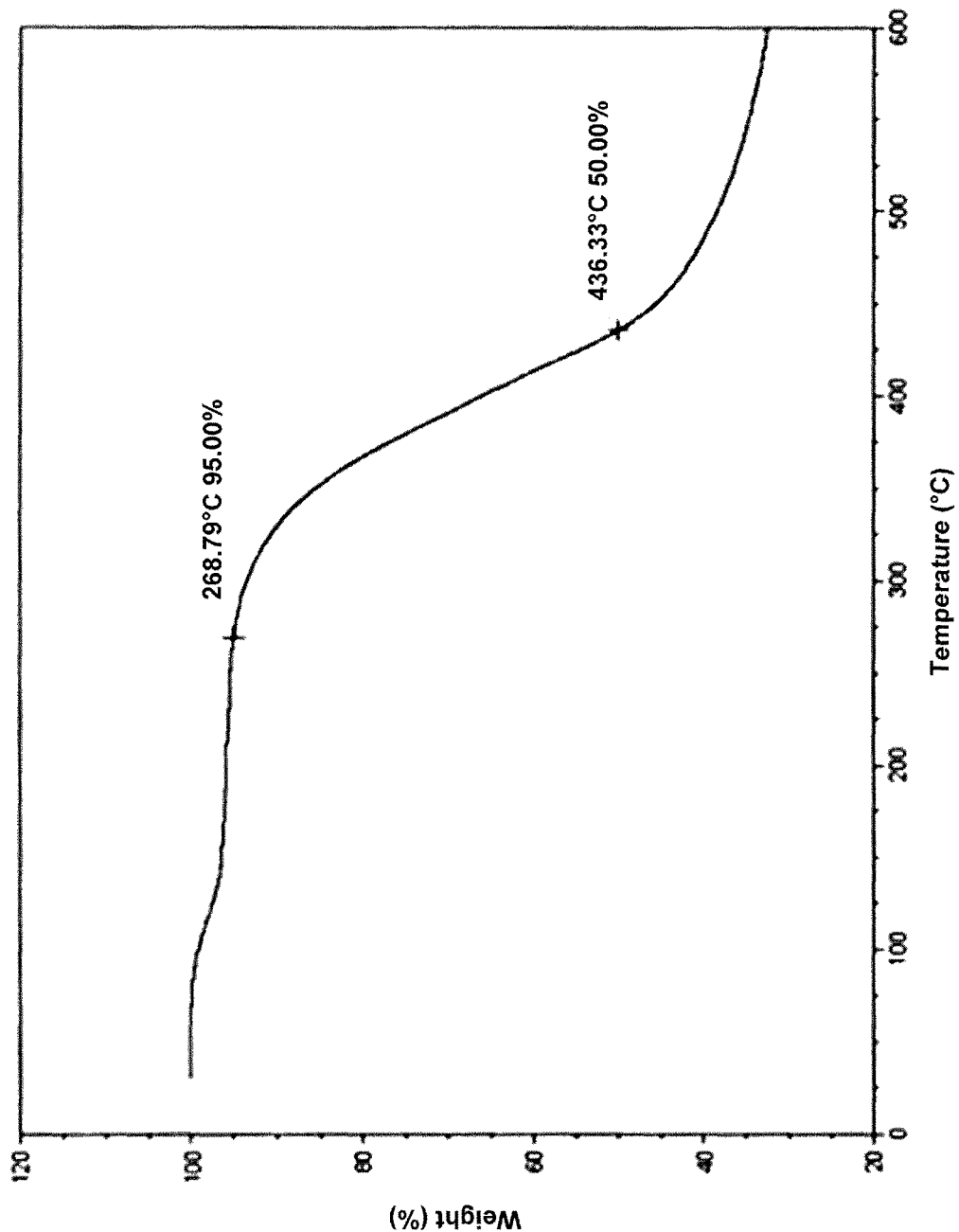
FIG. 18 is a TGA plot for 90:10 poly(ferulic acid-co-dihydroferulic acid), in accordance with an embodiment of the invention

Another embodiment of the invention is directed to copolymers of acetyldihydroferulic acid and acetylferulic acid, as shown in FIG. 10. The copolymers are equivalent to polystyrene with respect to thermal transitions where the proportions of the comonomers is appropriate, for example, a 50:50 mixture of monomers by mole results in a copolymer with a $T_g$ similar to atactic polystyrene. The properties of the copolymer are readily adjusted by the comonomer mixture used to prepare the copolymer. In general, as the proportion of acetylferulic acid derived units in the copolymer increases, the glass transition temperature increases. Therefore, polymers with little crystallinity can be formed where the glass transition temperature can range from about 70° C. to about 140° C. by selection of the appropriate comonomer feed ratio.

Methods and Materials

Unless otherwise noted, all solvents were sparged with nitrogen, dried over molecular sieves using an MBraun Solvent Purification System, dispensed into oven-dried Straus flasks, and degassed by stirring under reduced pressure for 20 minutes. Toluene for polymerization reactions was distilled from sodium/benzophenone under a nitrogen atmosphere and stored in an oven-dried Straus flask until used. All other chemicals and solvents were used as received.

Proton nuclear magnetic resonance ($^1$H NMR) spectra were recorded using a Varian Mercury 300 MHz spectrometer. Chemical shifts are reported in parts per million (ppm) downfield relative to tetramethylsilane (TMS, 0.0 ppm) or residual proton in the specified solvent. Coupling constants (0.1) are reported in Hertz (Hz). Multiplicities are reported using the following abbreviations: s, singlet; d, doublet; t, triplet; q, quartet; quin, quintuplet; m, multiplet; br, broad.

Differential scanning chromatographs were obtained with a DSC Q1000 from TA instruments. About 5-10 mg of each sample were massed and added to a sealed pan that went through a heat/cool/heat cycle at 10° C./min. Reported data are from the second full cycle. The temperature range depends on the experiment, but was limited to 300° C. by the instrument.

Thermogravimetric analyses were measured under nitrogen with a TGA Q5000 from TA Instruments. About 5-10 mg of each sample was heated at 50° C./min from 25-600° C.

Viscosity measurements were performed at 35° C. in a 1:2 mixture of phenol:1,1,2,2 tetrachloroethane with a CANNON-Ubbelohde type 150 viscometer.

(E)3-(4-acetoxy-3-methoxyphenyl)acrylic acid (acetylferulic acid)

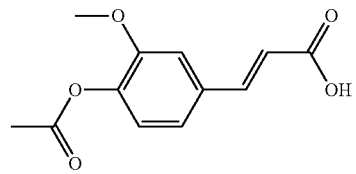 [SMILES: COc1cc(/C=C/C(=O)O)ccc1OC(C)=O]

In a round bottomed flask, 30.04 g of vanillin (0.197 mol) and 26.0 g of sodium acetate (0.317 mol) were dissolved in 200 mL of acetic anhydride (2.12 mol). About 1 mL of pyridine was added to the flask and the mixture was heated to reflux. After 24 h, the brown solution was poured over about 500 g of crushed ice and the solution was stirred until the appearance of a yellow-brown solid. The flask was left overnight in the freezer and a dark yellow solid was obtained by filtration. The crude solid was recrystallized from acetic acid/water to give 32.3 g of a yellow beige solid in a 69% yield.

Figure 2:
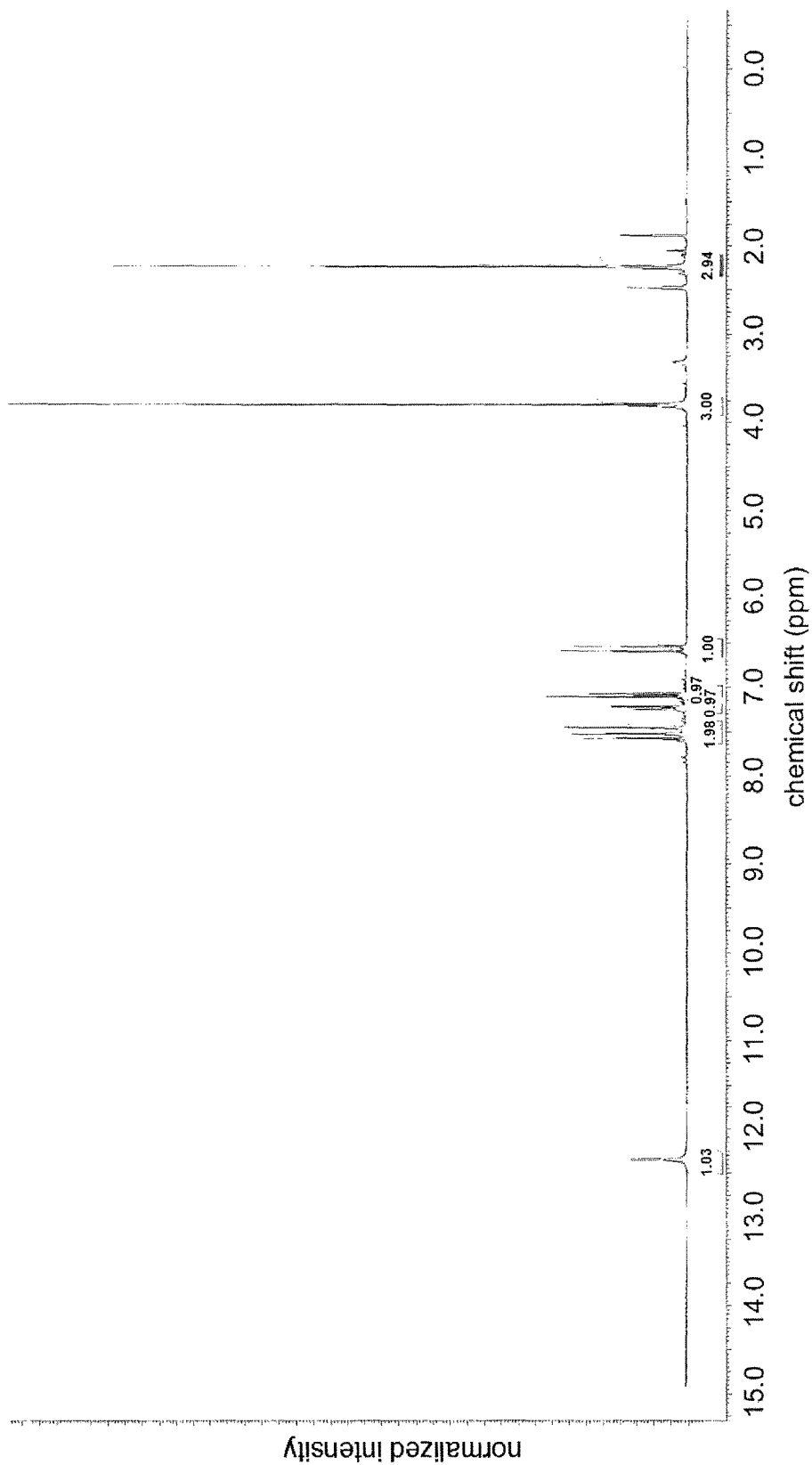
FIG. 2 is a $^1$H NMR spectrum of acetylferulic acid.

$^1$H NMR (DMSO) (FIG. 2): δ 12.35 (br s, 1H, COOH), 7.56 (d, J=15.9 Hz, 1H, Ar—CH), 7.46 (d, J=1.7 Hz, 1H, Ar—H), 7.24 (dd, J=8.2 Hz, 1.7 Hz, 1H, Ar—H), 7.09 (d, J=8.2 Hz, 1H, Ar—H), 6.56 (d, J=15.9 Hz, 1H, CHCOOH), 3.8 (s, 3H, OCH$_3$), 2.24 (s, 3H, CH$_3$).

Figure 3:
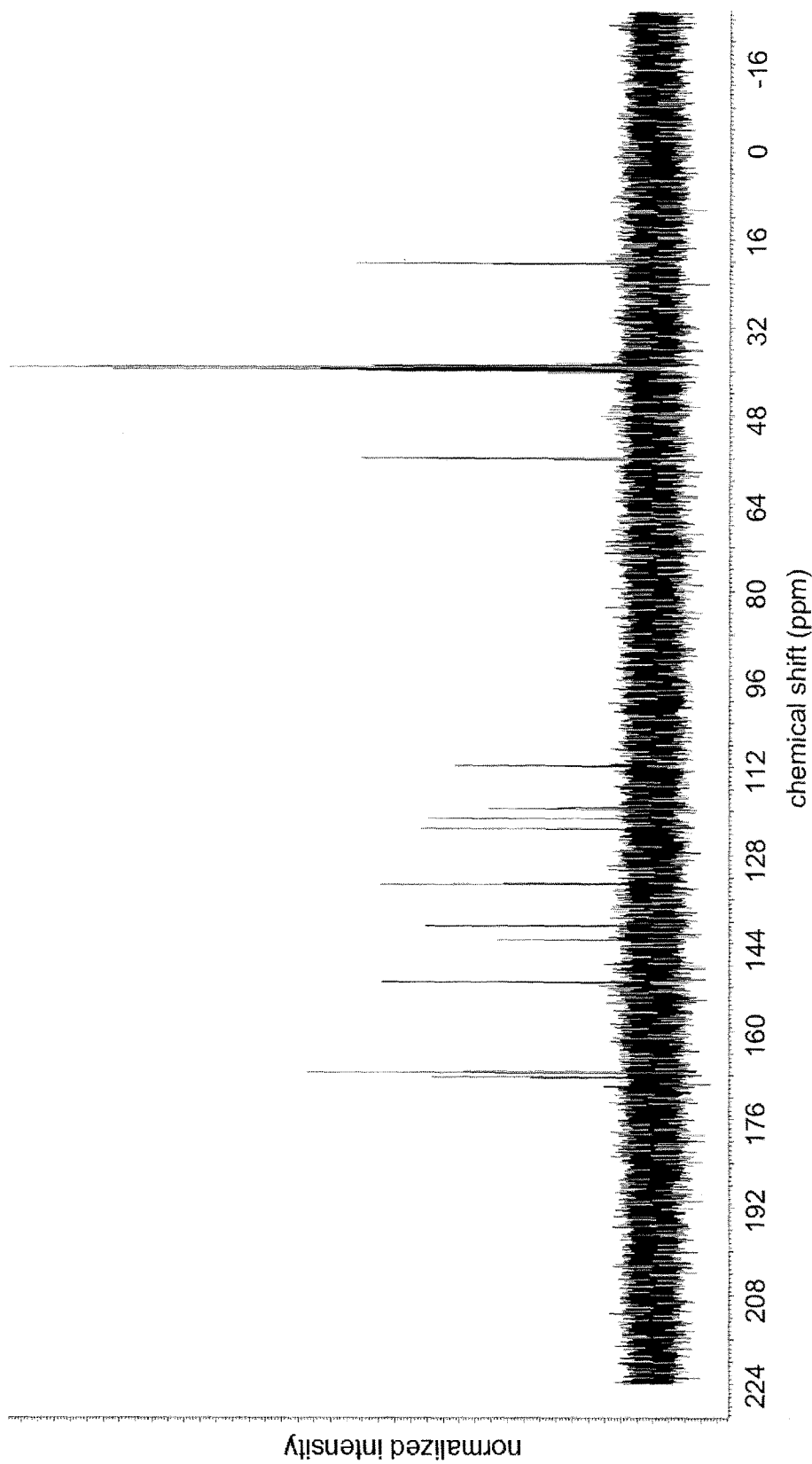
FIG. 3 is a $^{13}$C NMR spectrum of acetylferulic acid.

$^{13}$C NMR (DMSO) (FIG. 3): δ 168.4, 167.6, 151.1, 143.4, 140.8, 138.3, 123.2, 121.3, 119.5, 111.8, 56.0, 20.4.

(E)3-(4-acetoxy-3-methoxyphenyl)acrylic acid (acetylferulic acid) alternate synthesis In round bottomed flask, 10 g of (E)-3-(4-hydroxy-3-methoxy-phenyl)prop-2-enoic acid (ferulic acid) was dissolved in 14.7 mL of acetic anhydride and 15 mL of pyridine at room temperature with stirring for three hours. The resulting clear liquid was poured over 300 mL of an ice/deionized water slurry. After one hour, the ice/water mixture was gravity filtered, washed with deionized water, and dried. The resulting white powder was recrystallized in a 5:1 mixture of ethyl acetate and water and dried on a Schlenk line with a yield of 86%.

3-(4-acetoxy-3-methoxyphenyl)propanoic acid (acetyldihydroferulic acid)

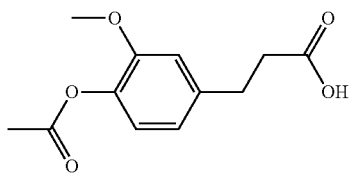 [SMILES: COc1cc(CCC(=O)O)ccc1OC(C)=O]

A 15.0 g (0.064 mol) portion of acetylferulic acid was dissolved in 230 mL of a 15:8 by volume mixture of tetrahydrofuran:methanol. The solution and 1.5 g of 10% palladium on charcoal was placed in a Parr pressure reactor. The reaction mixture was stirred at room temperature under 60 psi of hydrogen for 5 hours. The resulting black suspension was filtered through celite to remove the palladium on charcoal. The resulting clear brown solution was dried over magnesium sulfate and concentrated in vacuo. The solid was then dissolved in tetrahydrofuran and precipitated by addition to hexanes giving 12.8 g of an off-white product in 85% yield.

Figure 4:
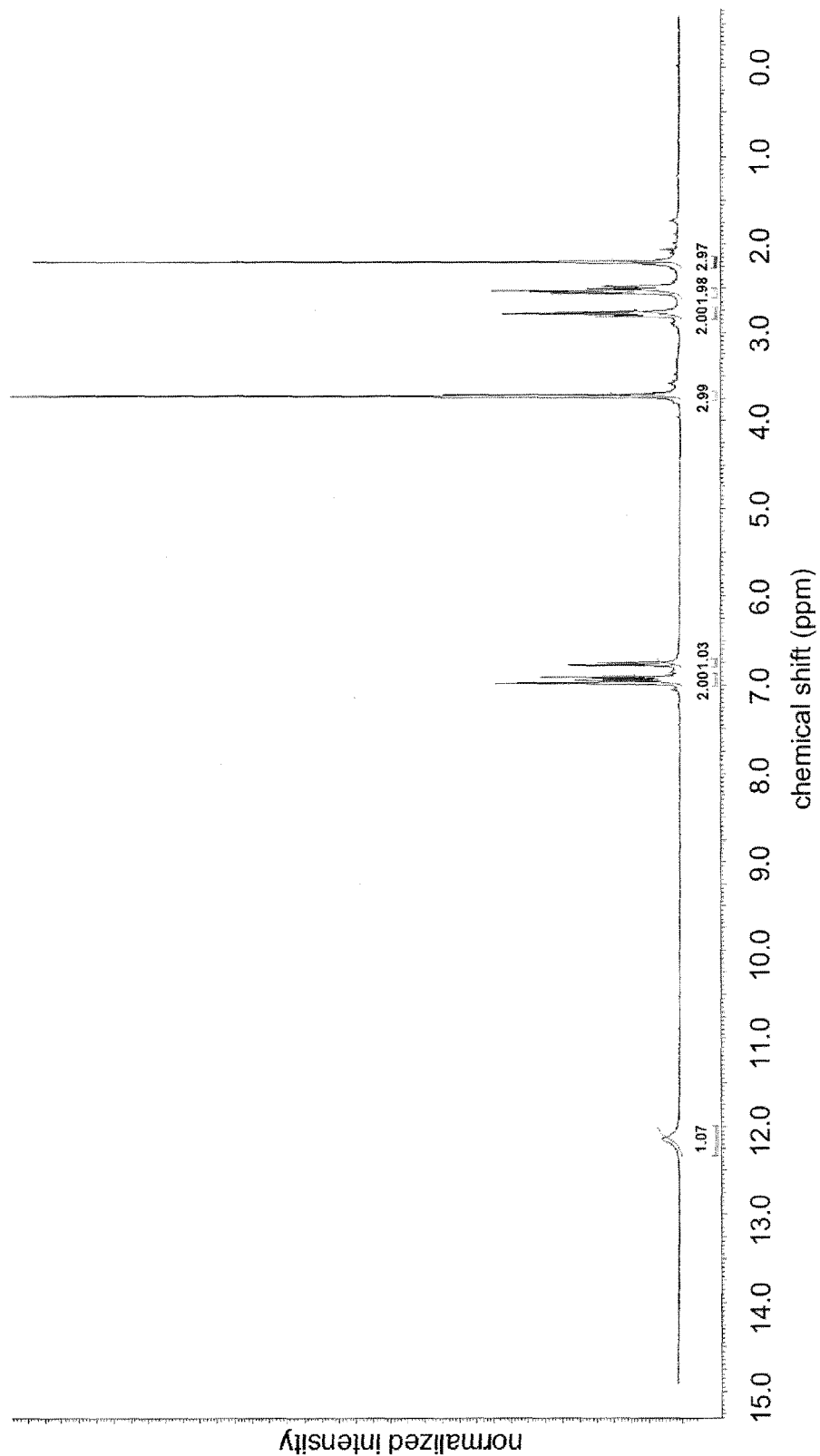
FIG. 4 is a $^1$H NMR spectrum of acetyldihydroferulic acid.

$^1$H NMR (DMSO) FIG. 4): δ 12.15 (br s, 1H, COOH), 6.98 (s, 1H, Ar—H), 6.93 (d, j=7.9 Hz, 1H, Ar—H), 6.76 (d, J=7.9 Hz, 1H, Ar—H), 3.72 (s, 3H, OCH$_3$), 2.79 (t, J=8.0 Hz, 2H, Ar—CH$_2$), 2.53 (t, J=8.0 Hz, 2H, CH$_2$COOH), 2.20 (s, 3H. CH$_3$).

Figure 5:
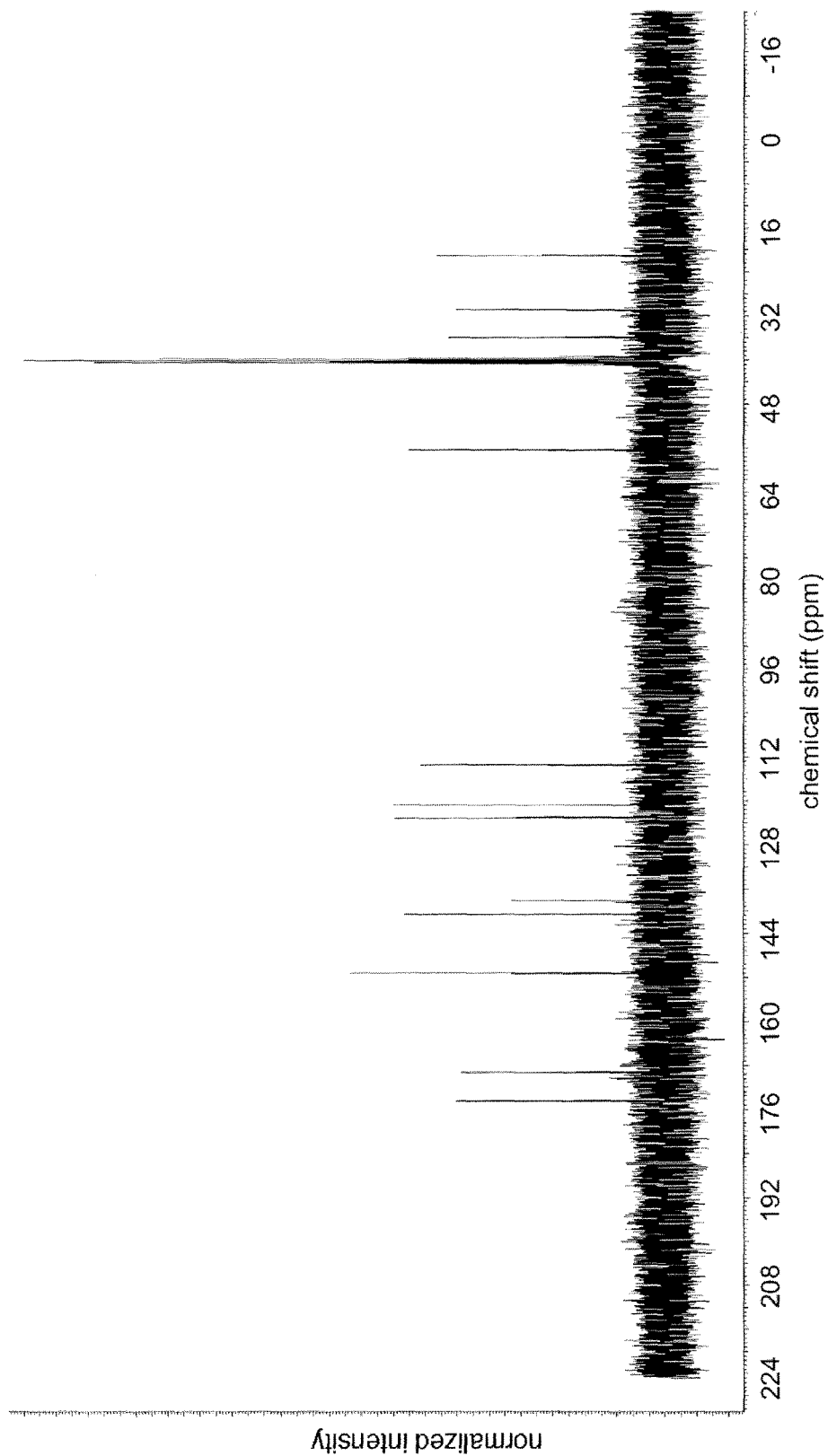
FIG. 5 is a $^{13}$C NMR spectrum of acetyldihydroferulic acid.

$^{13}$C NMR (DMSO) (FIG. 5): δ 174.1, 168.9, 150.8, 140.1, 137.8, 122.7, 120.3, 113.1, 55.9, 35.5, 30.5, 20.7.

3-(4-acetoxy-3-methoxyphenyl)propanoic acid (acetyldihydroferulic acid) alternate synthesis 1

A 15 g portion of acetyldihydroferulic acid, 150 ml, of tetrahydrofuran, and 80 mL of methanol were placed in a Parr pressure reactor containing 1.5 grams of 10% palladium on charcoal. The reaction mixture was stirred at 30° C. under 60 psi of hydrogen for five hours. To remove the palladium on charcoal, the resulting solution was vacuum filtered through celite, dried over magnesium sulfate, and condensed in vacuo. The solid was dissolved in a minimum amount of warm tetrahydrofuran (THF) and precipitated in ice cooled hexanes and the solid portion recrystallized from a 5:1 mixture of ethyl acetate and water and dried on a Schlenk line in a 62% yield.

3-(4-acetoxy-3-methoxyphenyl)propanoic acid (acetyldihydroferulic acid) alternate synthesis 2

A 10 g portion of ferulic acid, 150 mL of THF, and 80 mL of methanol were placed in a Parr pressure reactor with 1.5 grams of 10% palladium on charcoal. The reaction mixture was stirred at 30° C. under 60 psi of hydrogen for 12 hours. To remove the palladium on charcoal, the solution was vacuum filtered through celite, dried over magnesium sulfate, and condensed in vacuo. The solid was dissolved in a minimum amount of warm THF and poured into ice chilled hexanes and the solid portion recrystallized from a 5:1 mixture of ethyl acetate and water and dried on the Schlenk line. The crystals of dihydroferulic acid were acetylated by reaction with 9.6 g of acetic anhydride in the presence of 7.6 mL of pyridine. The mixture was stirred at room temperature for three hours and poured over an ice/water slurry (300 mL), to form a white precipitate that was filtered and dried on a Schlenk line, giving a 78% yield.

Polymers

A series of polymerization of acetyldihydroferulic acid was carried out as summarized in the following tables where Table 1 gives the polymerization conditions and polymer size and viscosity and Table 2 gives the thermal properties of the polymers.

Copolymers

Figure 19:
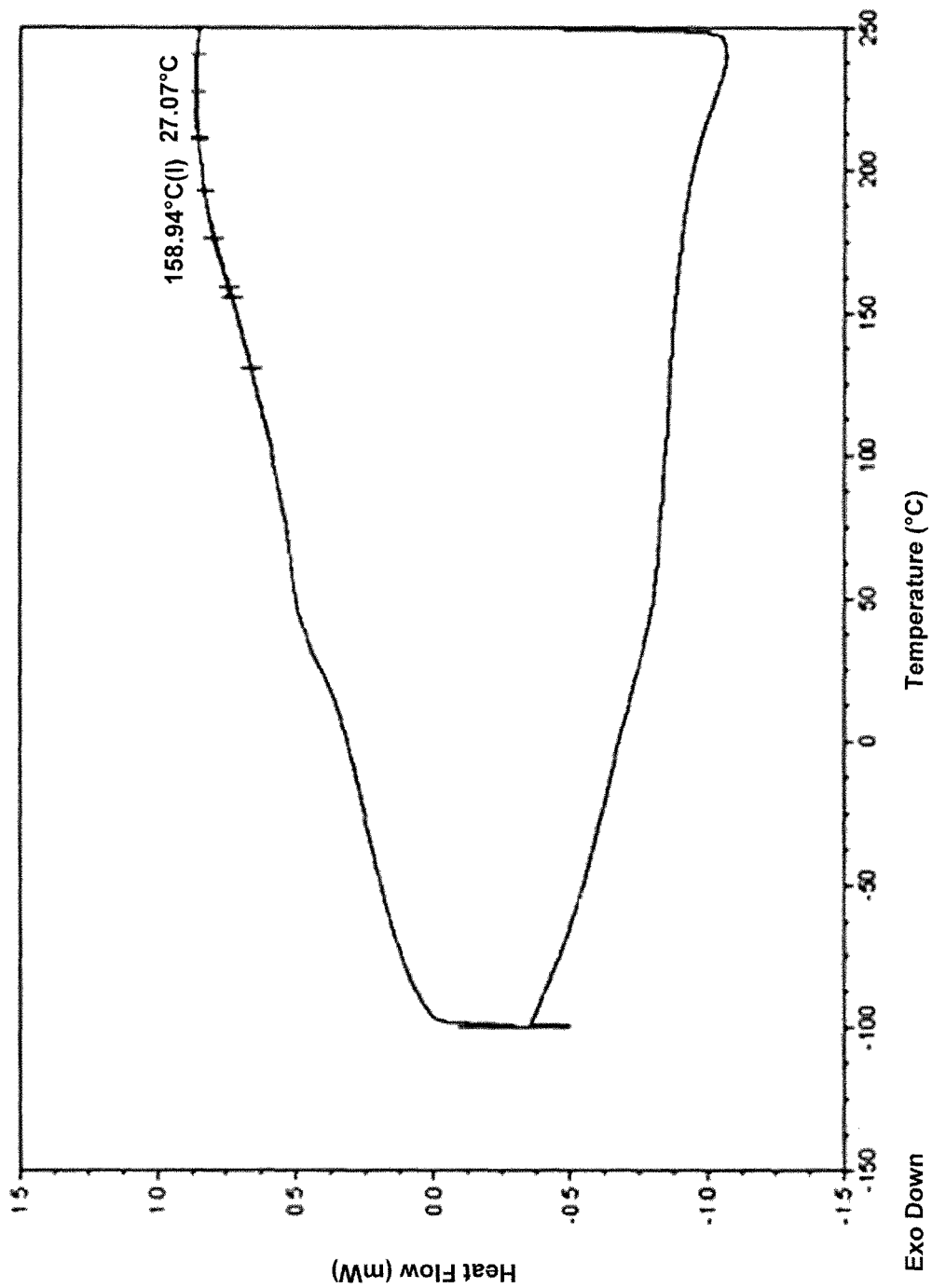
FIG. 19 is a DSC thermogram of poly(ferulic acid), in accordance with an embodiment of the invention.
Figure 20:
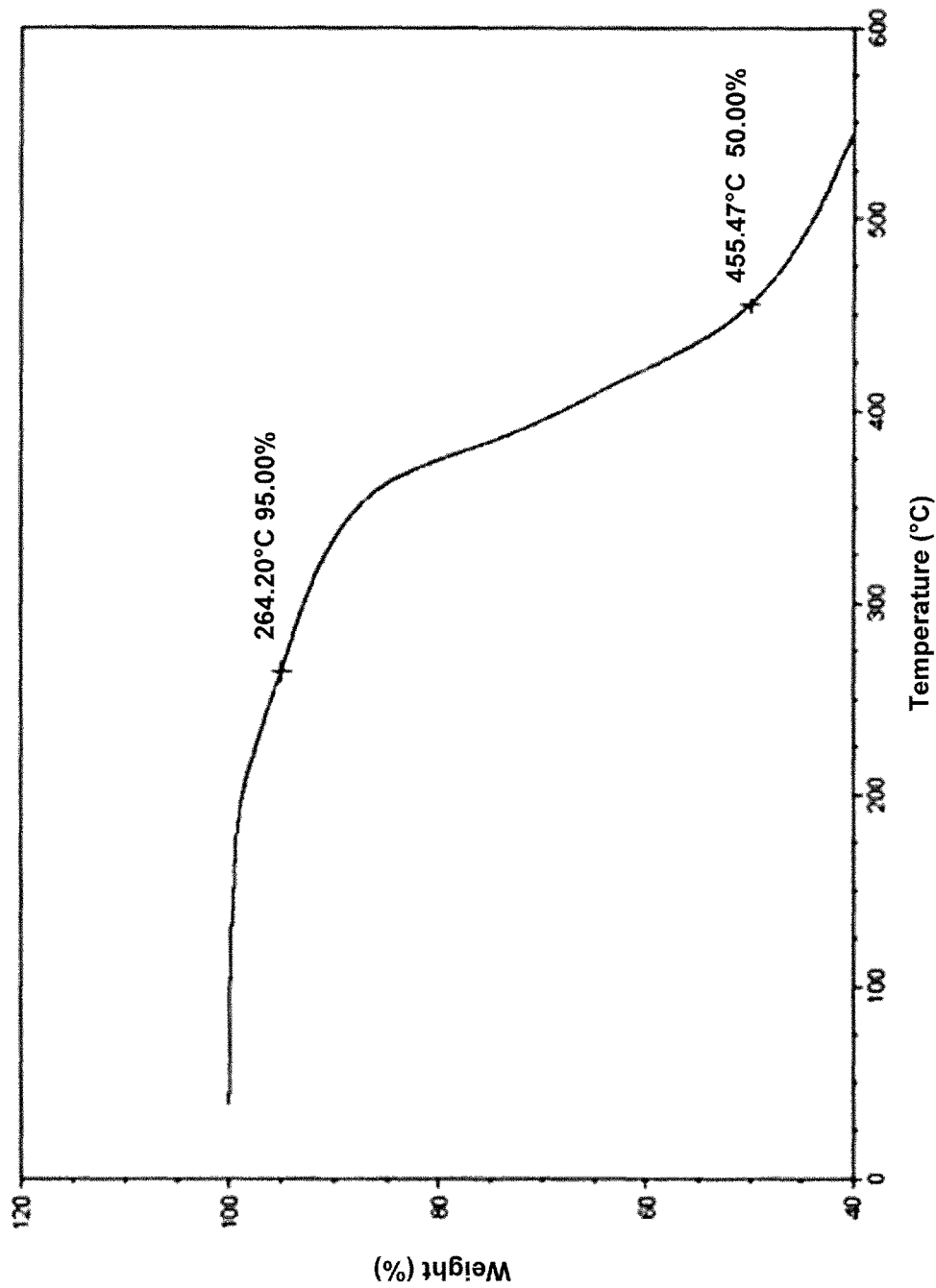
FIG. 20 is a TGA plot for poly(ferulic acid), in accordance with an embodiment of the invention

A series of copolymerizations of acetylferulic acid and acetyldihydroferulic acid was carried out with the mole and reaction conditions summarized in Table 3. All copolymerizations occurred by melting the two monomers under nitrogen for two hours at the temperature range between 260-280° C. in the presence of one mole % zinc acetate as catalyst. Vacuum was then applied for six hours, which resulted in a brown-orange solid. The solid was dissolved in a hot 1:1 mixture of trifluoroacetic acid/dichloromethane. Ice cooled methanol was added to the copolymer solution resulting in a yellow precipitate, which was filtered to isolate copolymer in 38 to 84% yield, as indicated in Table 3. Differential Scanning Calorimetry (DSC) and Thermogravimetric Analysis (TGA) plots for various copolymers 10:90, 30:70, 70:30 and 90:10 are shown in FIGS. 11-18, respectively. Differential Scanning Calorimetry (DSC) and Thermogravimetric Analysis (TGA) plots for poly(ferulic acid) are shown in FIGS. 19 and 20, respectively.

Polymer Molecular Weight Analysis

Viscosity Analysis

Intrinsic viscosity measurements were performed with a Ubbelohde viscometer. 15 mL of clean 1:2 mixture of phenol: 1,1,2,2-tetrachloroethane were poured in the viscometer and allow to thermally equilibrate for 2 h. Exactly 1 mL of about 8 g/L solution of polymer was added for each measurement until the final volume is 20 mL in the viscometer giving a final concentration of about 2 g/L.

$$[\eta] = \lim_{c \to 0} \frac{\eta_{sp}}{c} \text{ with } \eta_{sp} = \frac{t - t_0}{t_0}$$

$$\frac{\eta_{sp}}{c} = f(c)$$

From a Kramer plot and extrapolating to infinitely dilute solution (c→0), the intrinsic viscosity is obtained. The value is then related to the Mark-Houwink constant for PET in the same solvent and temperature.

$$[\eta] = 1.09 \times 10^{-2} M_v^{0.84}$$

End Group Analysis

Figure 6:
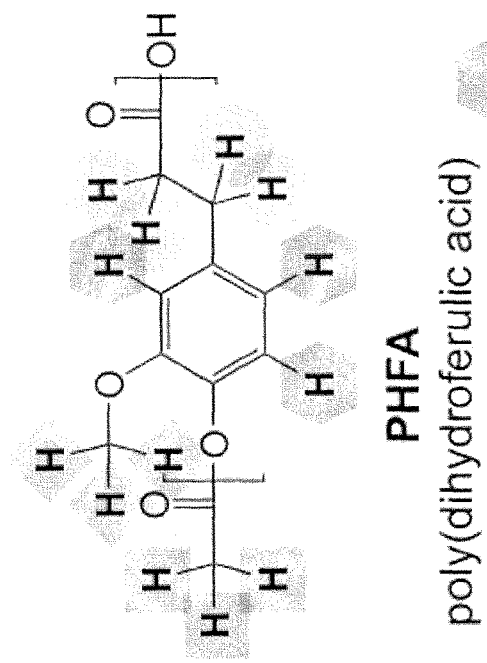
FIG. 6 is a $^1$H NMR spectrum of PHFA according to an embodiment of the invention with peak assignment indicated that was used for end-group analysis for the determination of the degree of polymerization.
Figure 6:
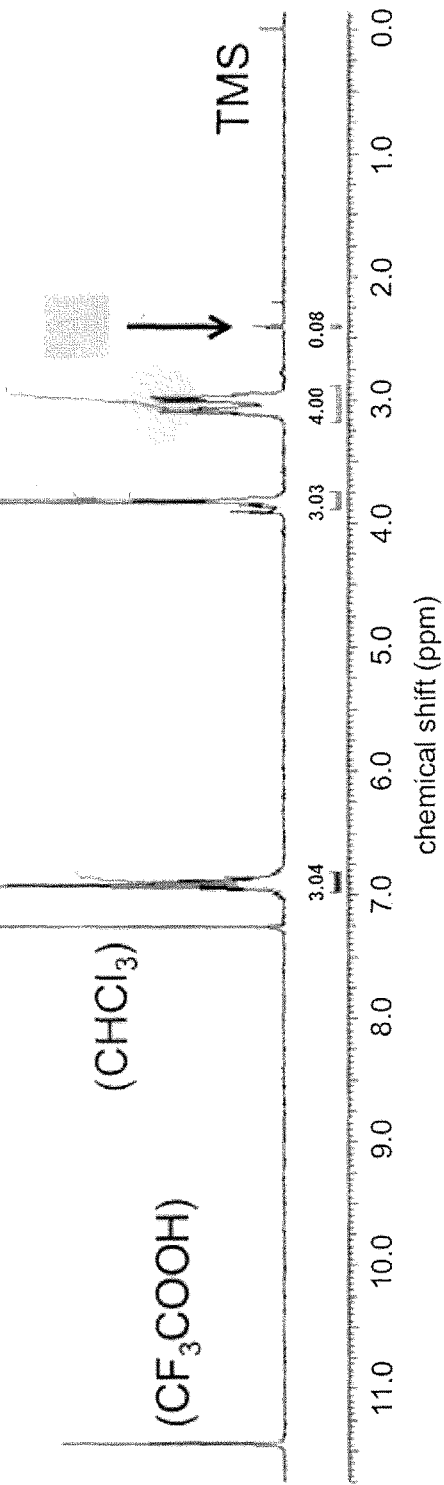

End group analysis was used to determine the degree of polymerization of the polymer. In an NMR analysis, the chemical environment for the end group is different from that of the repeat unit in the middle of the polymer chain. For PHFA, as shown in FIG. 6, the end groups are carboxylic acid and acetyl groups, which bear a methyl group that has a chemical shift of about 2.4 ppm. Four aliphatic hydrogens, associated with each repeat unit of the chain, resonate near 2.9 to 3.1 ppm. By measuring the integration of the methyl group hydrogens $I_{end}$ by $^1$H NMR and that of the methylene hydrogens ($I_n$) present in each repeat unit, the number of repeat units (the degree of polymerization, DP) and by the repeating unit's molecular weight, RU, the number average molecular weight of the polymer chain is determined using the following equation.

$$DP = \frac{3}{4} \times \frac{I_n}{I_{end}} \text{ and } M_n = RU \times DP$$

TABLE 1

Polymerization results and characterization of poly(dihydroferulic acid), PHFA.

| Entry | $T_p$ (° C.) | catalyst[a] | melt time (h) | vacuum time (h) | stirring (h) | yield (%) | $[\eta]$[b] | $M_v$[c] | DP[d] | $M_n$[d] |
|---|---|---|---|---|---|---|---|---|---|---|
| | | | acetyl dihydroferulic acid → PHFA | | | | | | | |
| 1 | 2 0200-220 | None | 2 | 2 | 1.5 | 83 | 31 | 12,900 | 27 | 4,800 |
| 2 | 2 200-220 | Sb$_2$O$_3$ | 2 | 2 | 0.5 | 67 | 29 | 12,000 | 23 | 4,100 |
| 3 | 2 200-220 | Zn(OAc)$_2$ | 2 | 2 | 0.5 | 82 | 27 | 11,000 | 38 | 6,800 |
| 4 | 2200-220 | Zn(OAc)$_2$ | 2 | 6 | 0.5 | 91 | 36 | 15,500 | 50 | 8,900 |
| 5 | 2 220-250 | Zn(OAc)$_2$ | 2 | 6 | 0.5 | 68 | 35 | 14,800 | 100 | 17,800 |
| 6 | 200-220 | Zn(OAc)$_2$ | 2 | 0.17 | — | 75 | 17 | 6,300 | 17 | 3,000 |
| 7 | 220 | Zn(OAc)$_2$ | 2 | 6 | — | 84 | — | — | — | — |
| | | | dihydroferulic acid → PHFA | | | | | | | |
| 8 | 2 200-220 | Sb$_2$O$_3$ | 5 | 6 | — | ~5 | n.d. | n.d. | 3.5[e] | 630[e] |

[a]Catalyst loading = 1 mol %.
[b]Intrinsic viscosity measured with an Ubbelohde viscometer in a 1:2 solution of phenol/1,1,2,2-tetrachloroethane at 35° C.
[c]Intrinsic viscosity (mL/g) calculated with $[\eta] = 1.09 \times 10^{-2} M_v^{0.84}$.
[d]Degree of Polymerization measured by $^1$H NMR end group analysis.
[e]GPC analysis.

TABLE 2

Figure 8:
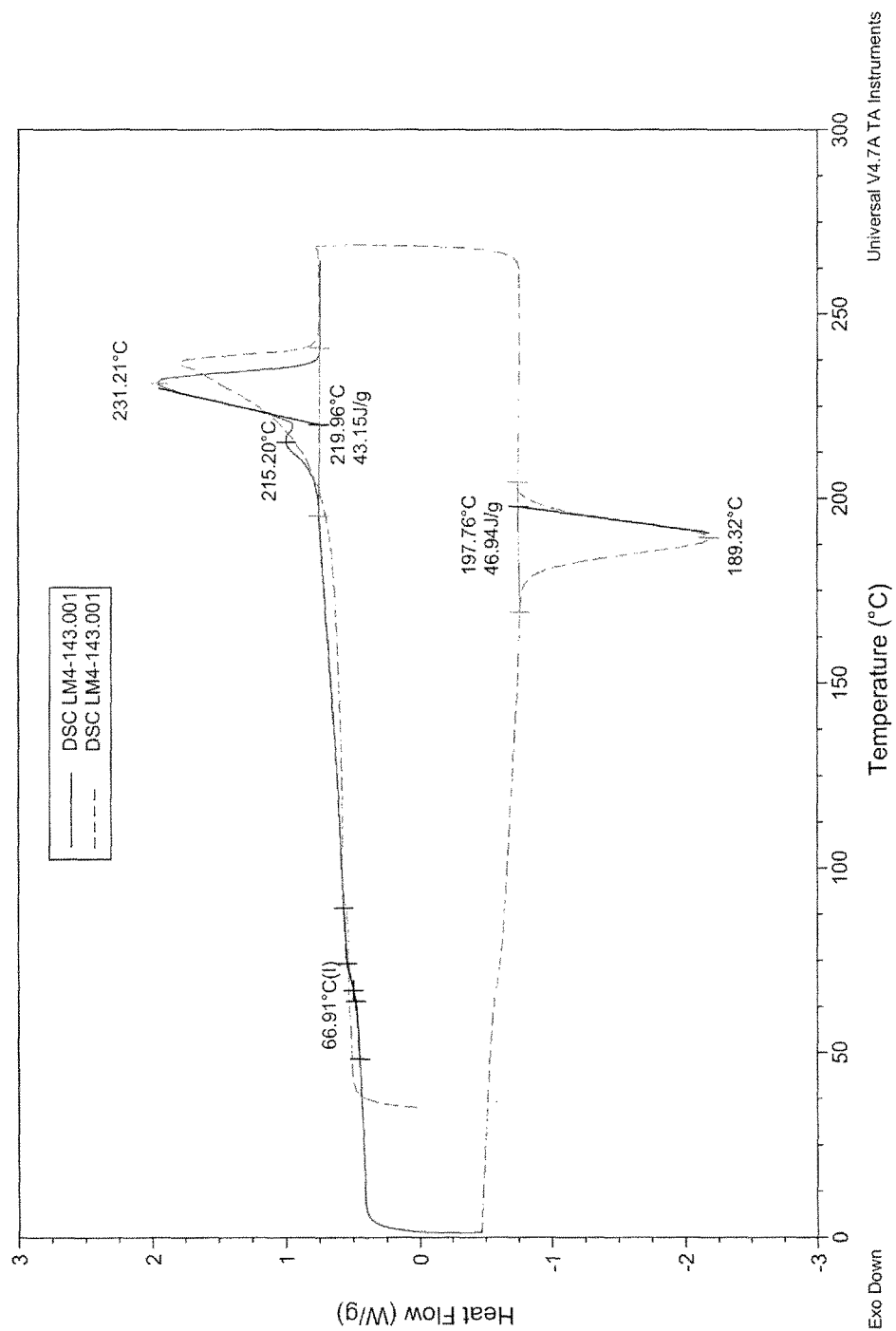
FIG. 8 is a DSC thermogram of PHFA in accordance with an embodiment of the invention.
Figure 9:
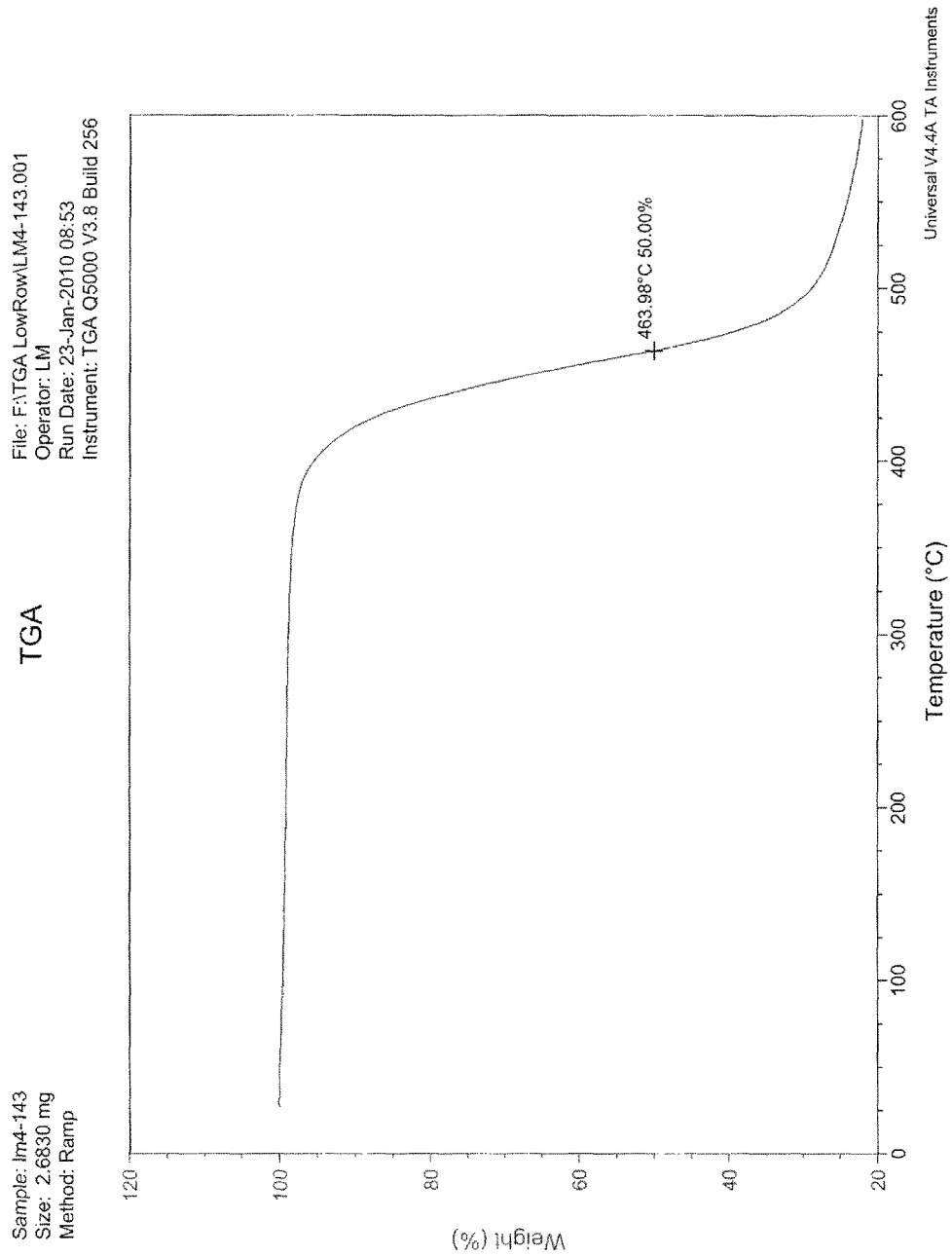
FIG. 9 is a TGA plot for PHFA in accordance with an embodiment of the invention.

Differential Scanning Calorimetry (DSC), as shown in FIG. 8, and Thermogravimetric Analysis (TGA), as shown in FIG. 9, data for PHFA from Table 1, entries 1-7.[a]

| Entry | $T_g$ (° C.) | major $T_m$ (° C.) | minor $T_m$ (° C.) | ΔH melt (J/g) | $T_c$ (° C.)[a] | ΔH cryst (J/g)[a] | T 50% decomp. (° C.)[b] |
|---|---|---|---|---|---|---|---|
| 1 | 74.0 | 242.6 | 228.9 | 47.7 | 207.1 | 51.0 | 471 |
| 2 | 73.4 | 234.4 | 216.9 | 43.5 | 193.4 | 48.1 | 462 |
| 3 | 73.3 | 234.1 | 220.4 | 39.8 | 195.8 | 44.9 | 461 |
| 4 | 66.9 | 231.2 | 215.2 | 43.2 | 189.3 | 46.9 | 464 |
| 5 | 66.6 | 216.3 | — | 27.9 | 162.2 | 26.8 | 456 |
| 6 | 65.1 | 240.3 | 219.6 | 51.4 | 203.2 | 54.6 | 452 |
| 7 | 73.0 | 242.9 | 228.9 | 38.6 | 204.5 | 42.2 | 422 |

[a]Crystallization was observed on the cooling scan, but not the heating scan.
[b]The temperature at which 50% mass loss is observed.
TGA was performed under nitrogen.

TABLE 3

Polymerization results and characterization of copolymerization of (A) acetyferulic and (B) acetyldihydroferulic acid (PHFA).

| Entry | % A | % B | Stirring[a] | Yield % | $T_g$ (° C.) | $T_m$ (° C.) | T 50% (° C.) |
|---|---|---|---|---|---|---|---|
| 1 | 0 | 100 | 0.5 | 84 | 73 | 243 | 422 |
| 2 | 10 | 90 | 1.5 | 47 | 73 | 217 | 422 |
| 3 | 20 | 80 | 2 | 46 | 70 | 213 | 419 |
| 4 | 30 | 70 | 1.5 | 35 | 86 | NA | 422 |
| 5 | 40 | 60 | 1.5 | 78 | 87 | NA | 404 |
| 6 | 50 | 50 | 1.5 | 82 | 95 | NA | 417 |
| 7 | 60 | 40 | 2 | 71 | 115 | NA | 440 |
| 8 | 70 | 30 | 1.5 | 68 | 123 | NA | 435 |
| 9 | 80 | 20 | 1.5 | 79 | 125 | 218 | 438 |
| 10 | 90 | 10 | 1.5 | 47 | 140 | 227 | 435 |
| 11 | 100 | 0 | 2 | 38 | 158 | NA | 446 |
| 12 | 100 | 0 | 2 | 56 | 155 | 290 | 467 |

[a]Time in hours that stirring stopped as the viscosity of the mixture increased.

Poly(3-(4-hydroxy-3-methoxyphenyl)propanoic acid) (poly(dihydroferulic acid), PHFA)

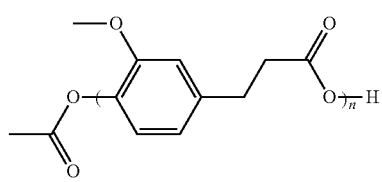 [SMILES: COc1cc(CCC(=O)O)ccc1OC(C)=O]

Table 1, Entry 1.

1.61 g (6.8 mmol) of acetyldihydroferulic acid were melted under nitrogen for 2 h and vacuum was applied for 2 h leaving a brown solid that was dissolved in a mixture of trifluoroacetic acid/dichloromethane and precipitated with methanol. 1.0 g of off-white product was obtained by filtration in 83% yield.

$^1$H NMR (CF$_3$COOD/CDCl$_3$): δ 6.92 (m, 3H, Ar—H), 3.84 (s, 3H, OCH$_3$), 3.11 (m, 2H, CH$_2$), 3.00 (m, 2H, CH$_2$).

$^{13}$C NMR (DMSO): δ 176.1, 150.9, 140.6, 138.3, 123.2, 121.8, 113.9, 56.6, 36.2, 31.2.

Table 1, Entry 2.

1.61 g (6.8 mmol) of acetyldihydroferulic acid and 0.021 g (0.072 mmol) of antimony trioxide (1 mol %) were melted under nitrogen for 2 h and vacuum was applied for 2 h leaving a brown solid that was dissolved in a mixture of trifluoroacetic acid/dichloromethane and precipitated with methanol. 0.8 g of off-white product was obtained by filtration in 67% yield.

$^1$H NMR (CF$_3$COOD/CDCl$_3$): δ 6.88 (m, 3H, Ar—H), 3.80 (s, 3H, OCH$_3$), 3.07 (m, 2H, CH$_2$), 2.96 (m, 2H, CH$_2$).

$^{13}$C NMR (CF$_3$COOD/CDCl$_3$): δ 175.5, 150.4, 140.1, 137.8, 122.6, 120.0, 113.4, 56.1, 35.8, 30.7.

Table 1, Entry 3.

1.63 g (6.8 mmol) of acetyldihydroferulic acid and 0.018 g (0.082 mmol) of zinc diacetate dihydrate (1 mol %) were melted under nitrogen for 2 h and vacuum was applied for 2 h leaving a brown solid that was dissolved in a mixture of trifluoroacetic acid/dichloromethane and precipitated with methanol. 1.0 g of off-white product was obtained by filtration in 82% yield.

$^1$H NMR (CF$_3$COOD/CDCl$_3$): 6.92 (m, 3H, Ar—H), 3.84 (s, 3H, OCH$_3$), 3.11 (m, 2H, CH$_2$), 3.00 (m, 2H, CH$_2$).

$^{13}$C NMR (CF$_3$COOD/CDCl$_3$): 175.4, 150.4, 140.0, 137.8, 122.6, 121.7, 113.3, 56.0, 35.7, 30.7.

Table 1, Entry 4.

1.63 g (6.8 mmol) of acetyldihydroferulic acid and 0.018 g (0.082 mmol) of zinc diacetate dihydrate (1 mol %) were melted under nitrogen for 2 h and vacuum was applied for 6 h leaving a brown solid that was dissolved in a mixture of trifluoroacetic acid/dichloromethane and precipitated with methanol. 1.1 g of off-white product was obtained by filtration in 91% yield.

$^1$H NMR (CF$_3$COOD/CDCl$_3$) (FIG. 6): δ 6.90 (m, 3H, Ar—H), 3.83 (s, 3H, OCH$_3$), 3.10 (m, 2H, CH$_2$), 2.99 (m, 2H, CH$_2$).

Figure 7:
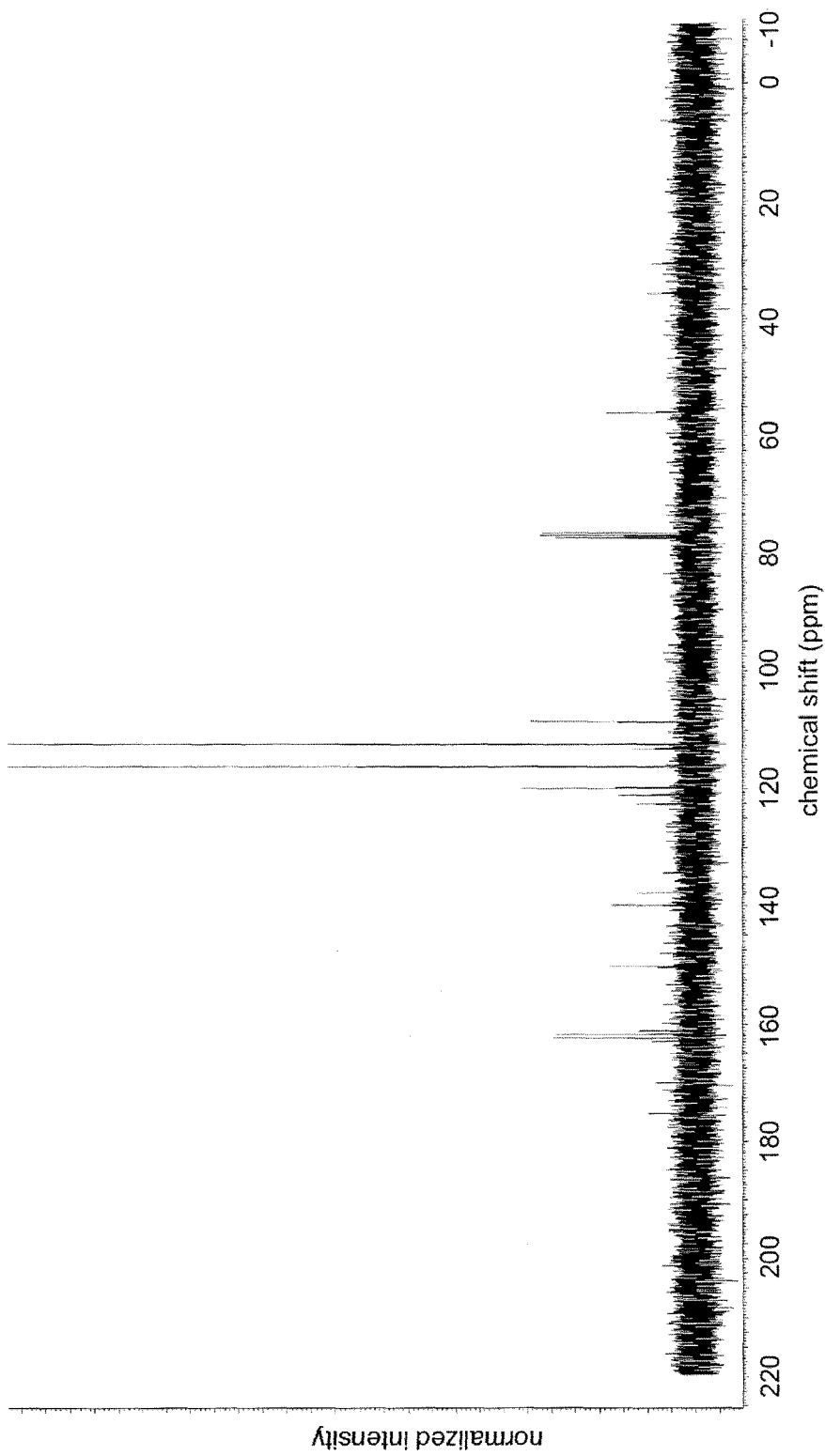
FIG. 7 is a $^{13}$C NMR spectrum of PHFA according to an embodiment of the invention.

$^{13}$C NMR (CF$_3$COOD/CDCl$_3$) (FIG. 7): δ 175.5, 150.4, 140.0, 137.7, 122.6, 121.1, 113.3, 56.0, 35.7, 30.7.

Table 1, Entry 5.

1.61 g (6.8 mmol) of acetyldihydroferulic acid and 0.017 g (0.077 mmol) of zinc diacetate dihydrate (1 mol %) were melted under nitrogen at 220-250° C. for 2 h and vacuum was applied for 6 h leaving a brown solid that was dissolved in a mixture of trifluoroacetic acid/dichloromethane and precipitated with methanol. 0.82 g of off-white product was obtained by filtration in 68% yield.

$^1$H NMR (CF$_3$COOD/CDCl$_3$): δ 6.88 (m, 3H, Ar—H), 3.80 (s, 3H, OCH$_3$), 3.07 (m, 2H, CH$_2$), 2.96 (m, 2H, CH$_2$).

$^{13}$C NMR (CF$_3$COOD/CDCl$_3$): δ 175.0, 150.4, 139.8, 137.7, 122.5, 121.0, 113.1, 56.0, 35.7, 30.7.

Table 1, Entry 6.

1.61 g (6.8 mmol) of acetyldihydroferulic acid and 0.017 g (0.077 mmol) of zinc diacetate dihydrate (1 mol %) were melted under nitrogen for 2 h and vacuum was applied for 10 min, leaving a brown solid that was dissolved in a mixture of trifluoroacetic acid/dichloromethane and precipitated with methanol. 0.90 g of off-white product was obtained by filtration in 75% yield.

$^1$H NMR (CF$_3$COOD/CDCl$_3$): δ 6.88 (m, 3H, Ar—H), 3.80 (s, 3H, OCH$_3$), 3.07 (m, 2H, CH$_2$), 2.96 (m, 2H, CH$_2$).

$^{13}$C NMR (CF$_3$COOD/CDCl$_3$): δ 176.0, 150.5, 140.4, 138.0, 122.8, 121.6, 113.7, 56.2, 35.9, 30.9.

Table 1, Entry 7.

1.63 g (6.8 mmol) of acetyldihydroferulic acid and 0.018 g (0.082 mmol) of zinc diacetate dihydrate (1 mol %) were melted under nitrogen for 2 h and vacuum was applied for 6 h leaving a brown solid that was dissolved in a mixture of trifluoroacetic acid/dichloromethane and precipitated with methanol. 1.02 g of off-white product was obtained by filtration in 84% yield.

3-(4-hydroxy-3-methoxyphenyl)propanoic acid (dihydroferulic acid)

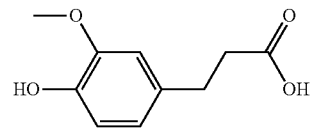

A solution was prepared from 8.0 g (0.034 mol) of acetyldihydroferulic acid and 4.7 g (0.118 mol) of sodium hydroxide in 100 mL of water and refluxed for 5 h. After cooling to room temperature, the aqueous solution was acidified with hydrochloric acid and extracted with dichloromethane. The organic layer was washed with brine and dried over magnesium sulfate. The evaporation of the solvent left a yellow crude product that was dissolved in dichloromethane and precipitated in hexanes to yield 5.5 g of an off-white powder in 83% yield.

$^1$H NMR (CDCl$_3$): δ 6.87 (d, J=8.0 Hz, 1H, Ar—H), 6.73 (br s, 1H, Ar—H), 6.71 (d, J=8.0 Hz, 1H, Ar—H), 3.88 (s, 3H, OCH$_3$), 2.90 (t, 0.1=7.8 Hz, 2H, Ar—CH$_2$), 2.70 (t, J=7.8 Hz, 2H, CH$_2$COOH).

$^{13}$C NMR (CDCl$_3$): δ 179.2, 146.4, 144.1, 132.0, 120.8, 114.4, 110.9, 55.8, 36.0, 30.3.

Oligo(3-(4-hydroxy-3-methoxyphenyl)propanoic acid) (oligo(dihydroferulic acid))

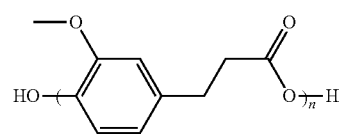

Table 1, Entry 8.

1.61 g (8.2 mmol) of dihydroferulic acid and 0.0195 g (0.067 mmol) of antimony trioxide (1 mol %) were heated under nitrogen for 5 h and vacuum was applied for 6 h. At the end of the 6 h period, the product was still a brown melt in the flask. The product was dissolved in dichloromethane/ trifluoroacetic acid and only 0.07 g (5%) of product precipitated upon addition of methanol. The methanol was subjected to rotary distillation, leaving 1.5 g of brown, amorphous solid that was analyzed by GPC showing only low molecular weight material.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A biorenewable thermoplastic poly(dihydroferulic acid), consisting of repeating units of the structure

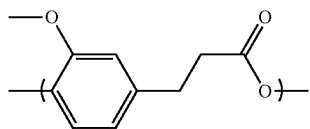

and end-groups.

2. The biorenewable thermoplastic poly(dihydroferulic acid) of claim 1, wherein the poly(dihydroferulic acid) has at least one acetoxy end-group.

3. A method of preparing poly(dihydroferulic acid) according to claim 1 comprising:
providing acetyldihydroferulic acid and a catalyst; and
polymerizing the acetyldihydroferulic acid to a poly(dihydroferulic acid) with the liberation of acetic acid.

4. The method of claim 3, wherein the acetyldihydroferulic acid is derived from one or more biorenewable sources.

5. The method of claim 4, wherein the biorenewable source is lignin or rice bran.

6. The method of claim 3, wherein the catalyst comprises an oxide, alkoxide or acetate of Sb, Ti, Ge, Hg, Si, Zr, Al, or Zn.

7. The method of claim 6, wherein the catalyst is $Zn(OAc)_2$.

8. The method of claim 3, wherein polymerizing is carried out under vacuum.

9. The method of claim 3, wherein polymerizing is carried out at a temperature of 200 to 300° C.

* * * * *

UNITED STATES PATENT AND TRADEMARK OFFICE
CERTIFICATE OF CORRECTION

PATENT NO. : 9,624,340 B2  
APPLICATION NO. : 14/734360  
DATED : April 18, 2017  
INVENTOR(S) : Laurent Mialon and Stephen A. Miller Page 1 of 1

It is certified that error appears in the above-identified patent and that said Letters Patent is hereby corrected as shown below:

In the Specification

Column 1,  
Line 10, "U.S. application" should read --U.S. Application--.

Column 6,  
Line 13, "(0.1) are" should read --($J$) are--.

Column 7,  
Line 39, "(s, 3H. $CH_3$)" should read --(s, 3H, $CH_3$)--.  
Line 46, "150 mL, of" should read --150 mL of--.

Column 9,  
Line 19, "2 0200-220" should read --200-220--.  
Line 20, "2 200-220" should read --200-220--.  
Line 21, "2 200-220" should read --200-220--.  
Line 22, "2200-220" should read --200-220--.  
Line 23, "2 220-250" should read --220-250--.  
Line 26, "2 220-250" should read --200-220--.

Column 12,  
Line 39, "(t, 0.1 = 7.8 Hz, 2H, Ar–$CH_2$)" should read --(t, $J$ = 7.8 Hz, 2H, Ar–$CH_2$)--.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*